US012707079B2

(12) United States Patent
Lee

(10) Patent No.: US 12,707,079 B2
(45) Date of Patent: Aug. 11, 2026

(54) IMAGE DECODING METHOD AND DEVICE ON BASIS OF AFFINE MOTION PREDICTION USING CONSTRUCTED AFFINE MVP CANDIDATE IN IMAGE CODING SYSTEM

(71) Applicant: LG ELECTRONICS INC., Seoul (KR)

(72) Inventor: Jaeho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/434,590

(22) Filed: Feb. 6, 2024

(65) Prior Publication Data

US 2024/0214603 A1 Jun. 27, 2024

Related U.S. Application Data

(63) Continuation of application No. 17/563,948, filed on Dec. 28, 2021, now Pat. No. 11,924,460, which is a (Continued)

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/124* (2014.11); *H04N 19/176* (2014.11)

(58) Field of Classification Search
CPC .. H04N 19/105; H04N 19/124; H04N 19/176; H04N 19/52; H04N 19/54
See application file for complete search history.

(56) References Cited

U.S. PATENT DOCUMENTS

2018/0098063 A1* 4/2018 Chen .................... H04N 19/139
2018/0098087 A1* 4/2018 Li ........................ H04N 19/132
(Continued)

FOREIGN PATENT DOCUMENTS

WO 2017/118409 A1 7/2017

OTHER PUBLICATIONS

Koo et al., "Description of SDR video coding technology proposal by LG Electronics", Joint Video Experts Team (JVET) of ITU-T SG 16 WP 3 and ISO/IEC JTC 1/SC 29/WG 11, JVET-J0017-v1, 10th Meeting: San Diego, CA, Apr. 10-20, 2018.
(Continued)

*Primary Examiner* — Anner Holder
(74) *Attorney, Agent, or Firm* — Bryan Cave Leighton Paisner LLP

(57) ABSTRACT

An image decoding method performed by a decoding device according to the present disclosure comprises the steps of: obtaining motion prediction information relating to a current block from a bitstream; generating an affine MVP candidate list for the current block; deriving CPMVPs for CPs of the current block on the basis of the affine MVP candidate list; deriving CPMVDs for the CPs of the current block on the basis of the motion prediction information; deriving CPMVs for the CPs of the current block on the basis of the CPMVPs and the CPMVDs; and deriving prediction samples for the current block on the basis of the CPMVs.

3 Claims, 24 Drawing Sheets

Related U.S. Application Data continuation of application No. 16/861,787, filed on Apr. 29, 2020, now Pat. No. 11,240,527, which is a continuation of application No. PCT/KR2019/009773, filed on Aug. 6, 2019.

(60) Provisional application No. 62/715,269, filed on Aug. 6, 2018.

(51) Int. Cl.
*H04N 19/124* (2014.01)
*H04N 19/176* (2014.01)

(56) References Cited

U.S. PATENT DOCUMENTS

| | | | | |
|---|---|---|---|---|
| 2018/0192069 | A1* | 7/2018 | Chen | H04N 19/176 |
| 2021/0203943 | A1* | 7/2021 | Lin | G06T 3/02 |
| 2022/0321907 | A1* | 10/2022 | Zheng | H04N 19/105 |

OTHER PUBLICATIONS

Chen et al., "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11, JVET-J0021, 10th Meeting: San Diego, US, Apr. 10-20, 2018.
Chen et al., "CE4: Affine inter prediction (Test 1.5)", Joint Video Experts Team (JVET) of ITU-T SG 16 WP 3 and ISO/IEC JTC 1/SC 29/WG 11, JVET-K0185-v3, 11th Meeting: Ljubljana, SI, Jul. 10-18, 2018.

* cited by examiner

FIG. 1

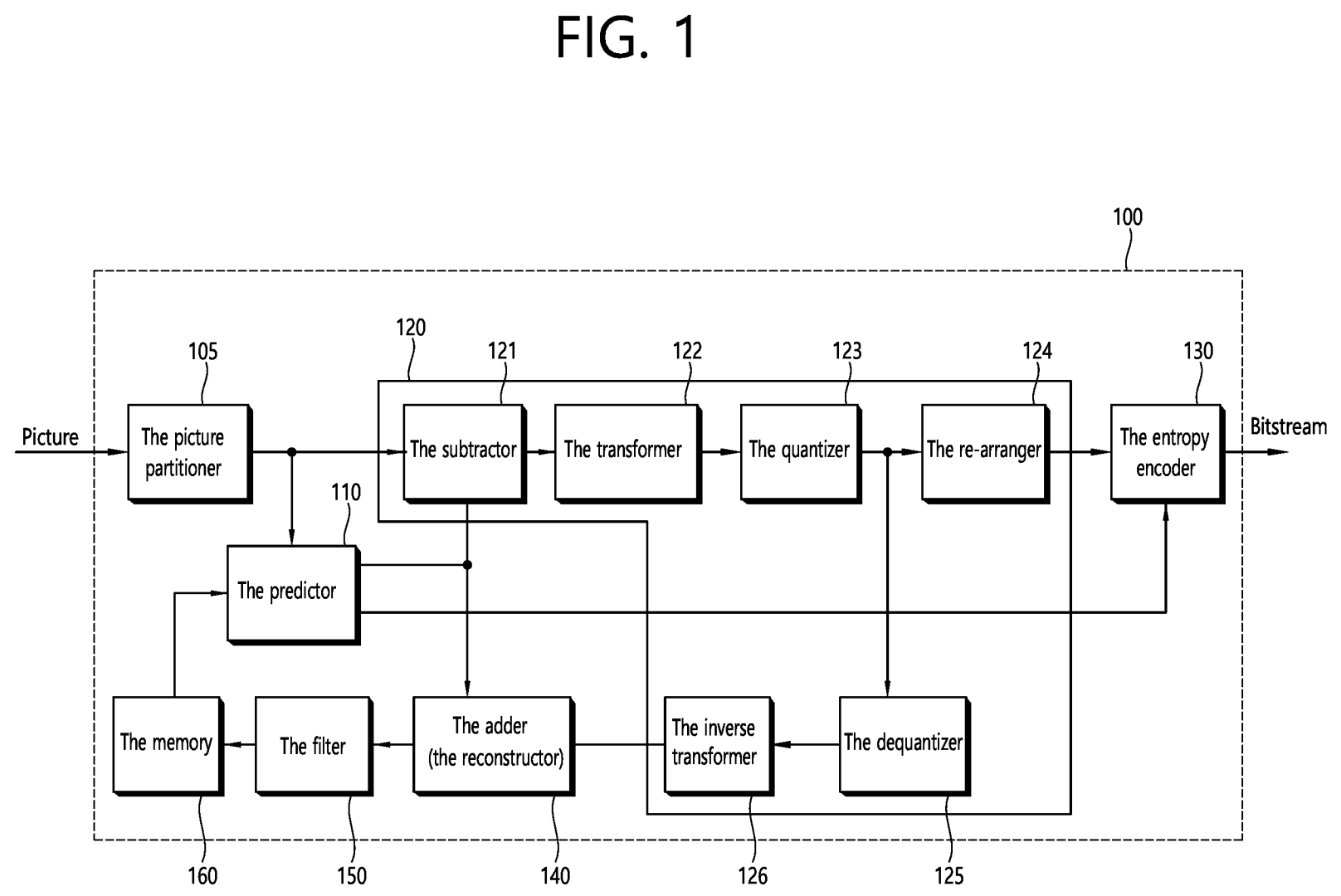

Picture
Bitstream
100
105 The picture partitioner
110 The predictor
120
121 The subtractor
122 The transformer
123 The quantizer
124 The re-arranger
125 The dequantizer
126 The inverse transformer
130 The entropy encoder
140 The adder (the reconstructor)
150 The filter
160 The memory 6 parameter model START : constructed candidate
(4 parameter model)
S1800
width >= height ?
YES
NO
S1810
mv0 & mv1 are
available
YES
NO
S1820
mv0 & mv2 are
available
YES
NO
S1830
Determine constructed candidate
END : constructed candidate
(4 parameter model)

IMAGE DECODING METHOD AND DEVICE ON BASIS OF AFFINE MOTION PREDICTION USING CONSTRUCTED AFFINE MVP CANDIDATE IN IMAGE CODING SYSTEM

CROSS-REFERENCE TO RELATED APPLICATIONS

Pursuant to 35 U.S.C. § 119(e), this application is a continuation of U.S. patent application Ser. No. 17/563,948, filed Dec. 28, 2021, which is a continuation U.S. patent application Ser. No. 16/861,787, filed Apr. 29, 2020, which is a continuation of International Application PCT/KR2019/009773, with an international filing date of Aug. 6, 2019, which claims the benefit of U.S. Provisional Application No. 62/715,269 filed on Aug. 6, 2018, the contents of which are all hereby incorporated by reference herein in their entirety.

BACKGROUND OF THE DISCLOSURE

Field of the Disclosure

The present disclosure relates to an image coding technique, and more particularly, to an image decoding method and apparatus based on affine motion prediction in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical problem to be addressed by the present disclosure lies in providing a method and an apparatus which increase image coding efficiency.

Another technical problem to be addressed by the present disclosure lies in providing an image decoding method and apparatus which construct an affine mvp candidate list of the current block by deriving a constructed affine mvp candidate based on a neighboring block only when all candidate motion vectors for CPs are available, and perform prediction for the current block based on the constructed affine mvp candidate list.

According to an embodiment of the present disclosure, there is provided an image decoding method which is performed by a decoding apparatus. The method includes obtaining motion prediction information for a current block from a bitstream, constructing an affine motion vector predictor (mvp) candidate list for the current block, deriving control point motion vector predictors (CPMVPs) for control points (CPs) of the current block based on the affine mvp candidate list, deriving control point motion vector differences (CPMVDs) for the CPs of the current block based on the motion prediction information, deriving control point motion vectors (CPMVs) for the CPs of the current block based on the CPMVPs and the CPMVDs, deriving prediction samples for the current block based on the CPMVs, and generating a reconstructed picture for the current block based on the derived prediction samples, wherein the affine mvp candidate list includes a constructed affine mvp candidate when the constructed affine mvp candidate is available, the constructed affine mvp candidate includes candidate motion vectors for the CPs, and the constructed affine mvp candidate is available when the candidate motion vectors are available.

According to another embodiment of the present disclosure, there is provided a decoding apparatus for performing image decoding. The decoding apparatus includes an entropy decoder obtaining motion prediction information for a current block from a bitstream, a predictor configured to construct an affine motion vector predictor (mvp) candidate list for the current block, derive control point motion vector predictors (CPMVPs) for control points (CPs) of the current block based on the affine mvp candidate list, derive control point motion vector differences (CPMVDs) for the CPs of the current block based on the motion prediction information, derive control point motion vectors (CPMVs) for the CPs of the current block based on the CPMVPs and the CPMVDs, and derive prediction samples for the current block based on the CPMVs, and an adder generating a reconstructed picture for the current block based on the derived prediction samples, wherein the affine mvp candidate list includes a constructed affine mvp candidate when the constructed affine mvp candidate is available, wherein the constructed affine mvp candidate includes candidate motion vectors for the CPs, and the constructed affine mvp candidate is available when the candidate motion vectors are available.

According to still another embodiment of the present disclosure, there is provided a video encoding method which is performed by an encoding apparatus. The method includes constructing an affine motion vector predictor (mvp) candidate list for the current block, deriving control point motion vector predictors (CPMVPs) for control points (CPs) of the current block based on the affine mvp candidate list, deriving CPMVs for the CPs of the current block, deriving control point motion vector differences (CPMVDs) for the CPs of the current block based on the CPMVPs and the CPMVs, and encoding motion prediction information including information on the CPMVDs, wherein the affine mvp candidate list includes a constructed affine mvp candidate when the constructed affine mvp candidate is available, the constructed affine mvp candidate includes candidate motion vectors for the CPs, and the constructed affine mvp candidate is available when the candidate motion vectors are available.

According to still another embodiment of the present disclosure, there is provided a video encoding apparatus. The encoding apparatus includes a predictor configured to construct an affine motion vector predictor (mvp) candidate list for a current block, derive control point motion vector predictors (CPMVPs) for control points (CPs) of the current block based on the affine mvp candidate list, derive CPMVs for the CPs of the current block, and derive control point motion vector differences (CPMVDs) for the CPs of the current block based on the CPMVPs and the CPMVs, a subtractor deriving control point motion vector differences (CPMVDs) for the CPs of the current block based on the CPMVPs and the CPMVs, and an entropy encoder encoding motion prediction information including information on the CPMVDs, wherein the affine mvp candidate list includes a constructed affine mvp candidate when the constructed affine mvp candidate is available, the constructed affine mvp candidate includes candidate motion vectors for the CPs, and the constructed affine mvp candidate is available when the candidate motion vectors are available.

According to the present disclosure, it is possible to increase overall image/video compression efficiency.

According to the present disclosure, it is possible to increase the efficiency of image coding based on the affine motion prediction.

According to the present disclosure, in deriving the affine mvp candidate list, only when all the candidate motion vectors for the CPs of the constructed affine mvp candidate are available, the constructed affine mvp candidate may be added, through which it is possible to reduce the complexity of the process of deriving the constructed affine mvp candidate and the process of constructing the affine mvp candidate list, and to improve the coding efficiency.

BRIEF DESCRIPTION OF THE DRAWINGS

FIG. 1 is a schematic diagram illustrating a configuration of a video encoding apparatus to which the present disclosure is applicable.

DESCRIPTION OF EXEMPLARY EMBODIMENTS

Figure 2:
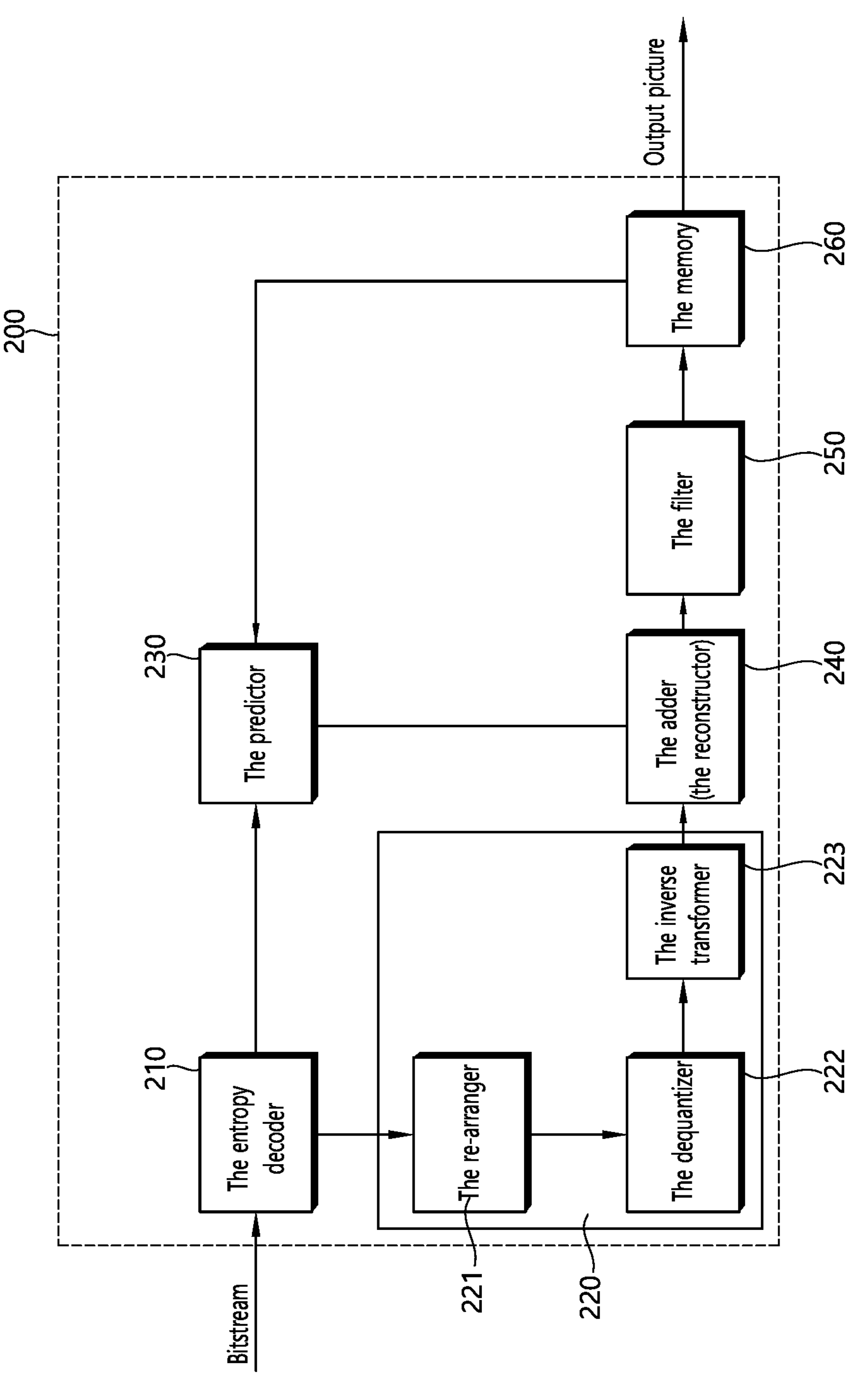
FIG. 2 is a schematic diagram illustrating a configuration of a video decoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as “include” and “have” are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present disclosure, video may refer to a series of images over time. A picture generally refers to a unit representing one image in a specific time zone, and a slice is a unit constituting part of a picture in coding. One picture may include a plurality of slices or tile groups, and if necessary, the picture, slices, and tile groups may be mixed with each other and used. In this document, an image may be a still image or may represent an image of a specific time constituting video. Hereinafter, image coding may be mixed with video coding. Also, image coding may be mixed with picture coding or frame coding.

A pixel or a pal may refer to a minimum unit constituting one picture (or image). Further, a 'sample' may be used as a term corresponding to a pixel. The sample may generally represents a pixel or a value of a pixel, may represent only a pixel (a pixel value) of a luma component, and may represent only a pixel (a pixel value) of a chroma component.

A unit represents a basic unit of image processing. The unit may include at least one of a specific region of the picture and information related to the region. The unit may be used interchangeably with terms such as block or area in some cases. Alternatively, the unit may include a luma component block and a chroma component block cb and cr. In a general case, an M×N block may represent a set of samples or transform coefficients including M columns and N rows.

FIG. 1 is a diagram schematically illustrating a configuration of a video/image encoding apparatus to which the present disclosure may be applied. Hereinafter, the video encoding apparatus may include an image encoding apparatus.

Referring to FIG. 1, a video encoding apparatus 100 may include a picture partitioner 105, a predictor 110, a residual processor 120, an entropy-encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may partition an input picture into at least one processing unit.

As an example, a processing unit may be called a coding unit (CU). In this case, the coding unit may be recursively split from the largest coding unit (LCU) according to a quad-tree binary-tree (QTBT) structure. For example, one coding unit may be divided into a plurality of coding units of a deeper depth based on a quad tree structure, a binary tree structure, and/or a ternary tree structure. In this case, for example, the quad tree structure may be applied first, and the binary tree structure and the ternary tree structure may be applied later. Alternatively, the binary tree structure/ternary tree structure may be applied first. A coding procedure according to the present disclosure may be performed based on the final coding unit which is not split any further. In this case, a maximum coding unit may be used as a final coding unit immediately based on coding efficiency according to the image characteristics or, if necessary, the coding unit may be recursively split into coding units of a deeper depth and a coding unit having an optimal size may be used as a final coding unit. Here, the coding procedure may include a procedure of prediction, transform, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a colpositioned picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy-encoder 130 may perform entropy encoding on the quantized transform coefficients. Entropy encoding may include, for example, encoding methods such as exponential Golomb, context-adaptive variable length coding (CAVLC), context-adaptive binary arithmetic coding (CABAC), and the like. The entropy-encoder 130 may encode information necessary for video reconstruction other than the quantized transform coefficients (e.g., a value of a syntax element) together or separately according to entropy encoding or a predetermined method. The encoded information may be transmitted or stored in units of network abstraction layer (NAL) in the form of a bitstream. The bitstream may be transmitted over a network or may be stored in a digital storage medium. The network may include a broadcasting network and/or a communication network, and the digital storage medium may include various storage mediums such as USB, SD, CD, DVD, Blu-ray, HDD, SSD, and the like.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

FIG. 2 is a diagram schematically illustrating a configuration of a video/image decoding apparatus to which the present disclosure may be applied. Hereinafter, the video decoding apparatus may include a video decoding apparatus.

Referring to FIG. 2, the video decoding apparatus 200 may include an entropy decoder 210, a residual processor 220, a predictor 230, an adder 240, a filter 250, and a memory 260. The residual processor 220 may include a rearranger 221, a dequantizer 222, and an inverse transformer 223. In addition, although not shown, the video decoding apparatus 200 may include a receiver that receives a bitstream including video information. The receiver may be configured as a separate module or may be included in the entropy decoder 210.

When a bitstream including video/image information is input, the video decoding apparatus 200 may reconstruct a video/image/picture according to a process in which the video/image information is processed in the video encoding apparatus.

For example, the video decoding apparatus 200 may perform video decoding using a processing unit applied in the video encoding apparatus. Thus, a processing unit block of video decoding may be, for example, a coding unit, and may be, in another example, a coding unit, a prediction unit, or a transform unit. The coding unit may be split according to a quad tree structure, a binary tree structure and/or a ternary tree structure from the largest coding unit.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information on prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information on a reference picture index may be acquired or derived based on the information on prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 230 may acquire a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, in the case of inter prediction, an inter prediction method considering distortion of an image has been proposed. Specifically, an affine motion model has been proposed to efficiently derive a motion vector for sub-blocks or sample points of a current block and to increase accuracy of inter prediction despite deformation of image rotation, zoom-in or zoom-out. That is, an affine motion model which derives a motion vector for sub-blocks or sample points of a current block has been proposed. Prediction using the affine motion model may be called affine inter prediction or affine motion prediction.

For example, the affine inter prediction using the affine motion model may efficiently express four motions, that is, four deformations, as described below.

Figure 3:
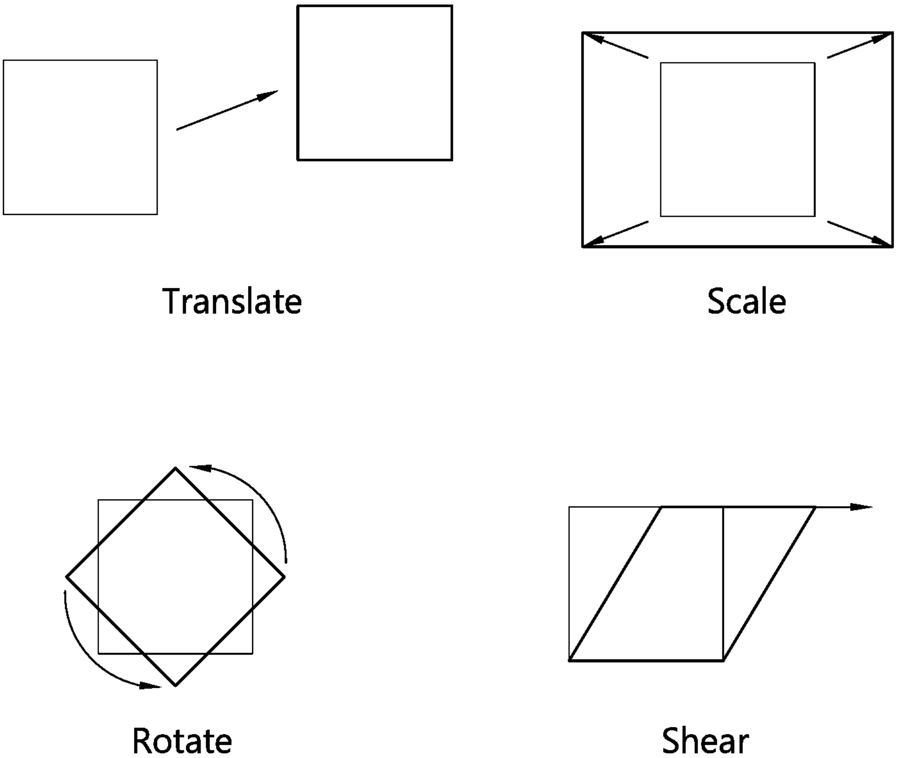
FIG. 3 illustrates a motion expressed through an affine motion model.

FIG. 3 illustrates a motion expressed through the affine motion model. Referring to FIG. 3, a motion that may be represented through the affine motion model may include a translational motion, a scale motion, a rotational motion, and a shear motion. That is, a scale motion in which (a portion of) image is scaled according to the passage of time, a rotational motion in which (a portion of) image is rotated according to the passage of time, and a shear motion in which (a portion of) image is parallelogrammically deformed according to the passage of time, as well as the translational motion in which an (portion of) image is planarly moved according to the passage of time illustrated in FIG. 3, may be effectively represented as illustrated in FIG. 3.

The encoding apparatus/decoding apparatus may predict a distortion shape of the image based on the motion vectors at control points (CPs) of the current block through the affine inter prediction the compression performance of the image may be improved by increasing accuracy of prediction. In addition, since a motion vector for at least one control point of the current block may be derived using a motion vector of a neighboring block of the current block, a burden of a data amount on additional information may be reduced and inter prediction efficiency may be improved considerably.

As an example of the affine inter prediction, motion information at three control points, that is, three reference points, may be required.

Figure 4:
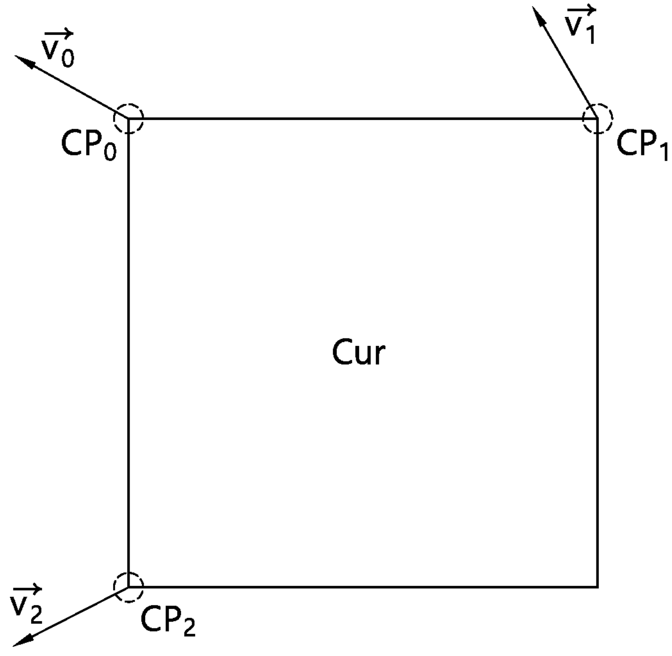
FIG. 4 illustrates the affine motion model in which motion vectors for 3 control points are used.

FIG. 4 illustrates the affine motion model in which motion vectors for three control points are used.

When a top-left sample position in a current block 400 is (0, 0), sample positions (0, 0), (w, 0), and (0, h) may be defined as the control points as shown in FIG. 4. Hereinafter, the control point of the sample position (0, 0) may be represented as CP0, the control point of the sample position (w, 0) may be represented as CP1, and the control point of the sample position (0, h) may be represented as CP2.

An equation for the affine motion model may be derived using the control points and the motion vectors of the corresponding control points described above. An equation for the affine motion model may be expressed as follows.

$$\begin{cases} v_x = \frac{(v_{1x}-v_{0x})}{w}*x+\frac{(v_{2x}-v_{0x})}{h}*y+v_{0x} \\ v_y = \frac{(v_{1y}-v_{0y})}{w}*x-\frac{(v_{2y}-v_{0y})}{h}*y+v_{0y} \end{cases} \quad \text{[Equation 1]}$$

Here, w denotes a width of the current block 400, h denotes a height of the current block 400, $v_{0x}$ and $v_{0y}$ denote an x component and y component of the motion vector of CP0, respectively, $v_{1x}$ and $v_{1y}$ denote an x component and a y component of the motion vector of CP1, respectively, and $v_{2x}$ and $v_{2y}$ denote an x component and a y component of the motion vector of CP2, respectively. In addition, x denotes an x component of a position of a target sample in the current block 400, y denotes a y component of the position of the target sample in the current block 400, $v_x$ denotes an x component of a motion vector of the target sample in the current block 400, and $v_y$ denotes a y component of the motion vector of the target sample in the current block 400.

Since the motion vector of CP0, the motion vector of CP1, and the motion vector of CP2 are known, a motion vector based on the sample position in the current block may be derived based on Equation 1. That is, according to the affine motion model, the motion vectors $v0(v_{0x}, v_{0y})$, $v1(v_{1x}, v_{1y})$, and $v2(v_{2x}, v_{2y})$ at the control points may be scaled based on a distance ratio between the coordinates (x, y) of the target sample and the three control points to derive the motion vectors of the target sample according to the position of the target sample. That is, according to the affine motion model, a motion vector of each sample in the current block may be derived based on the motion vectors of the control points. Meanwhile, a set of motion vectors of samples in the current block derived according to the affine motion model may be referred to as an affine motion vector field (MVF).

Meanwhile, six parameters for Equation 1 may be represented by a, b, c, d, e, and f as shown in Equation 1 below, and an equation for the affine motion model represented by the six parameters may be as follows.

$$a=\frac{(v_{1x}-v_{0x})}{w} \quad b=\frac{(v_{2x}-v_{0x})}{h} \quad c=v_{0x} \quad \text{[Equation 2]}$$

$$d=\frac{(v_{1y}-v_{0y})}{w} \quad e=-\frac{(v_{2y}-v_{0y})}{h} \quad f=v_{0y}$$

$$\begin{cases} v_x = a*x+b*y+c \\ v_y = d*x+e*y+f \end{cases}$$

Here, w denotes a width of the current block 400, h denotes a height of the current block 400, $v_{0x}$ and $v_{0y}$ denote the x component of the motion vector of CP0, y components, $v_{1x}$ and $v_{1y}$ represent an x component and a y component of the motion vector of CP1, respectively, and $v_{2x}$ and $v_{2y}$ represent the x component and the y component of the motion vector of CP2, respectively. In addition, x denotes the x component of the position of the target sample in the current block 400, y denotes the y component of the position of the target sample in the current block 400, $v_x$ denotes the x component of the motion vector of the target sample in the current block 400, $v_y$ denotes the y component of the motion vector of the target sample in the current block 400.

The affine motion model or the affine inter prediction using the six parameters may be referred to as a 6-parameter affine motion model or AF6.

In addition, as an example of the affine inter prediction, motion information at two control points, i.e., two reference points, may be required.

Figure 5:
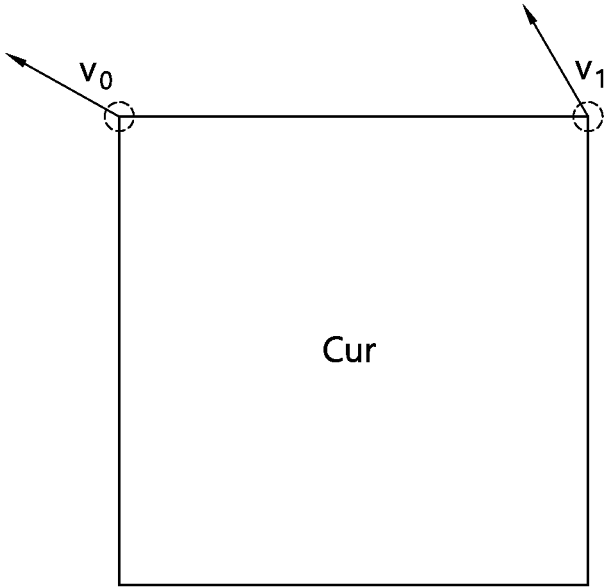
FIG. 5 illustrates an affine motion model in which motion vectors for 2 control points are used.

FIG. 5 illustrates the affine motion model in which motion vectors for two control points are used. The affine motion model using two control points may represent three motions including a translational motion, a scale motion, and a rotational motion. The affine motion model representing the three motions may be referred to as a similarity affine motion model or a simplified affine motion model.

When a top-left sample position in a current block 500 is (0, 0), sample positions (0, 0) and (w, 0) may be defined as the control points as shown in FIG. 5. Hereinafter, the control point of the sample position (0, 0) may be represented as CP0 and the control point of the sample position (w, 0) may be represented as CP1.

An equation for the affine motion model may be derived using the control points and the motion vectors of the corresponding control points described above. An equation for the affine motion model may be expressed as follows.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases} \quad \text{[Equation 3]}$$

Here, w denotes a width of the current block 500, $v_{0x}$ and $v_{0y}$ denote x and y components of the motion vector of CP0, respectively, and $v_{1x}$ and $v_{1y}$ denote x and y components of the motion vector of CP1. In addition, x denotes an x component of a position of a target sample in the current block 500, y denotes a y component of the position of the target sample in the current block 500, $v_x$ denotes an x component of the motion vector of the target sample in the current block 500, and $v_y$ denotes a y component of the motion vector of the target sample in the current block 500.

Meanwhile, four parameters of Equation 3 may be represented by a, b, c, and d as in the following Equation, and an equation for the affine motion model represented by the four parameters may be as follows.

$$a = \frac{(v_{1x} - v_{0x})}{w} \quad b = \frac{(v_{1y} - v_{0y})}{w} \quad c = v_{0x} \quad d = v_{0y} \quad \text{[Equation 4]}$$

$$\begin{cases} v_x = a * x - b * y + c \\ v_y = b * x + a * y + d \end{cases}$$

Here, w denotes a width of the current block 500, $v_{0x}$ and $v_{0y}$ denote x and y components of the motion vector of CP0, respectively, and $v_{1x}$ and $v_{1y}$ denote x and y components of the motion vector of CP1, respectively. In addition, x denotes an x component of a position of a target sample in the current block 500, y denotes a y component of the position of the target sample in the current block 500, $v_x$ denotes an x component of the motion vector of the target sample in the current block 500 and $v_y$ denotes a y component of the motion vector of the target sample in the current block 500. The affine motion model using the two control points may be represented by four parameters a, b, c, and d as shown in Equation 4, and thus, the affine motion model using the four parameters or the affine inter prediction may be referred to as a 4-parameter affine motion model or AF4. That is, according to the affine motion model, a motion vector of each sample in the current block may be derived based on the motion vectors of the control points. Meanwhile, a set of motion vectors of the samples in the current block derived according to the affine motion model may be referred to as an affine motion vector field (MVF).

Meanwhile, as described above, a motion vector of a sample unit may be derived through the affine motion model, and thus accuracy of inter prediction may be significantly improved. In this case, however, complexity in the motion compensation process may be significantly increased.

Accordingly, it may be limited such that a motion vector of a sub block unit of the current block, instead of deriving a motion vector of the sample unit, is derived.

Figure 6:
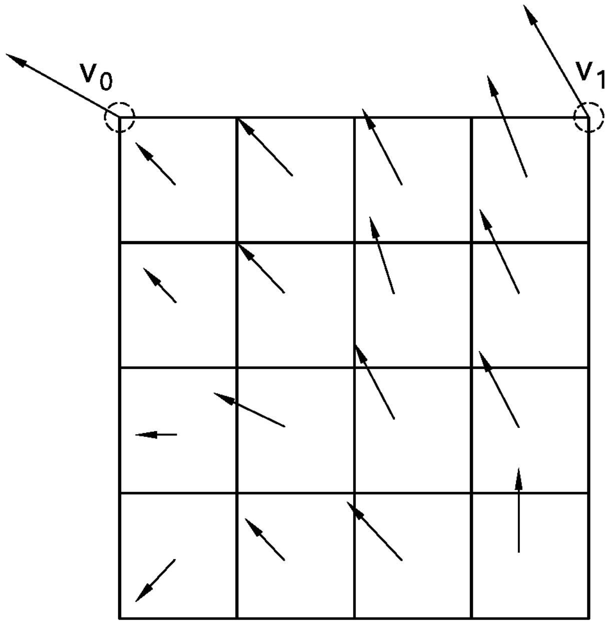
FIG. 6 illustrates a method of deriving a motion vector on a sub-block basis based on the affine motion model.

FIG. 6 illustrates a method of deriving a motion vector on a sub-block basis based on the affine motion model. FIG. 6 illustrates a case where a size of the current block is 16×16 and a motion vector is derived in units of 4×4 subblocks. The sub block may be set to various sizes. For example, when the sub block is set to n×n size (n is a positive integer, e.g., n is 4), a motion vector may be derived in units of n×n sub blocks in the current block based on the affine motion model and various methods for deriving a motion vector representing each subblock may be applied.

For example, referring to FIG. 6, a motion vector of each subblock may be derived using the center or bottom right side sample position of each subblock as a representative coordinate. Here, the center bottom right position may indicate a sample position positioned on the bottom right side among four samples positioned at the center of the sub block. For example, when n is an odd number, one sample may be positioned at the center of the sub block, and in this case, the center sample position may be used for deriving the motion vector of the sub block. However, when n is an even number, four samples may be positioned to be adjacent at the center of the subblock, and in this case, the bottom right sample position may be used to derive a motion vector. For example, referring to FIG. 6, representative coordinates of each subblock may be derived as (2, 2), (6, 2), (10, 2), . . . , (14, 14), and encoding apparatus/decoding apparatus may derive the motion vector of each subblock by substituting each of the representative coordinates of the subblocks into Equation 1 or 3 described above. The motion vectors of the subblocks in the current block derived through the affine motion model may be referred to as affine MVF.

Meanwhile, as an example, the size of the sub block in the current block may be derived based on the following equation.

$$\begin{cases} M = \text{clip3}\left(4, w, \frac{w * MvPre}{\max(\text{abs}(v_{1x} - v_{0x}), \text{abs}(v_{1y} - v_{0y}))}\right) \\ N = \text{clip3}\left(4, h, \frac{h * MvPre}{\max(\text{abs}(v_{2x} - v_{0x}), \text{abs}(v_{2y} - v_{0y}))}\right) \end{cases} \quad \text{[Equation 5]}$$

Here, M denotes a width of the sub block, and N denotes a height of the sub block. In addition, $v_{0x}$ and $v_{0y}$ denote an x component and a y component of CPMV0 of the current block, $v_{1x}$ and $v_{1y}$ denote an x component and a y component of CPMV1 of the current block, w denotes a width of the current block, h denotes a height of the current block, and MvPre denotes a motion vector fraction accuracy. For example, the motion vector fraction accuracy may be set to 1/16.

Meanwhile, in the inter prediction using the above-described affine motion model, that is, the affine motion prediction, may have an affine merge mode AF_MERGE and an affine inter mode AF_INTER. Here, the affine inter mode may be referred to as an affine MVP mode AF_MVP.

The affine merge mode is similar to an existing merge mode in that MVD for the motion vector of the control points is not transmitted. That is, similarly to the existing skip/merge mode, the affine merge mode may refer to an encoding/decoding method of performing prediction by deriving a CPMV for each of two or three control points from a neighboring block of the current block.

For example, when the AF_MRG mode is applied to the current block, MVs (i.e., CPMV0 and CPMV1) for CP0 and CP1 may be derived from the neighboring block to which the affine mode is applied among the neighboring blocks of the current block. That is, CPMV0 and CPMV1 of the neighboring block to which the affine mode is applied may be derived as merge candidates, and the merge candidates may be derived as CPMV0 and CPMV1 for the current block.

The affine inter mode may represent inter prediction of performing prediction based on an affine motion vector predictor (MVP) by deriving an MVP for a motion vector of the control points, driving a motion vector of the control points based on a motion vector difference (MOD) and the MVP, and driving an affine MVF of the current block based on the motion vector of the control points. Here, the motion vector of the control point may be represented as a control point motion vector (CPMV), the MVP of the control point may be represented as a control point motion vector predictor (CPMVP), and the MVD of the control point may be represented as a control point motion vector difference (CPMVD). Specifically, for example, the encoding apparatus may derive a control point motion vector predictor (CPMVP) and a control point motion vector (CPMV) for each of CP0 and CP1 (or CP0, CP1, and CP2) and transmit or store information on the CPMVP and/or the CPMVD, which is a difference between CPMVP and CPMV.

Here, when the affine inter mode is applied to the current block, the encoding apparatus/decoding apparatus may construct an affine MVP candidate list based on a neighboring block of the current block, the affine MVP candidate may be referred to as a CPMVP pair candidate, and the affine MVP candidate list may be referred to as a CPMVP candidate list.

In addition, each of the affine MVP candidates may refer to a combination of CPMVPs of CP0 and CP1 in a 4-parameter affine motion model and may refer to a combination of CPMVPs of CP0, CP1, and CP2 in a 6-parameter affine motion model.

Figure 7:
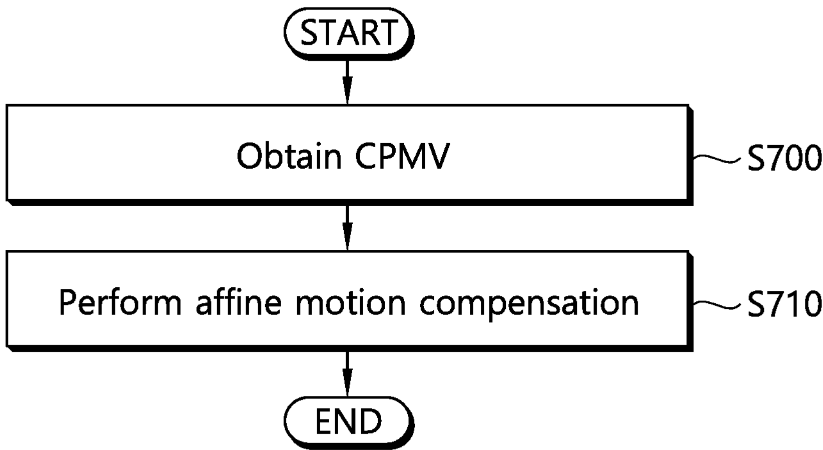
FIG. 7 is a flowchart illustrating an affine motion prediction method according to an embodiment of the present disclosure.

FIG. 7 is a flowchart illustrating an affine motion prediction method according to an embodiment of the present disclosure.

Referring to FIG. 7, the affine motion prediction method may be represented as follows. When the affine motion prediction method starts, first, a CPMV pair may be obtained (S700). Here, the CPMV pair may include CPMV0 and CPMV1 when using the 4-parameter affine model.

Thereafter, affine motion compensation may be performed based on the CPMV pair (S710), and affine motion prediction may be terminated.

In addition, there may be two affine prediction modes to determine the CPMV0 and the CPMV1. Here, the two affine prediction modes may include an affine inter mode and an affine merge mode. In the affine inter mode, the CPMV0 and the CPMV1 may be clearly determined by signaling two motion vector difference (MVD) information for the CPMV0 and the CPMV1. Meanwhile, in the affine merge mode, a CPMV pair may be derived without MVD information signaling.

In other words, in the affine merge mode, the CPMV of the current block may be derived using the CPMV of the neighboring block coded in the affine mode, and in the case of determining the motion vector in units of sub blocks, the affine merge mode may be referred to as a subblock merge mode.

In the affine merge mode, the encoding apparatus may signal, to the decoding apparatus, an index of a neighboring block coded in the affine mode for deriving the CPMV of the current block and may further signal a difference value between the CPMV of the neighboring block and the CPMV of the current block. Here, in the affine merge mode, an affine merge candidate list may be constructed based on a neighboring block, and an index of the neighboring block may represent a neighboring block to be referred to in order to derive the CPMV of the current block on the affine merge candidate list. The affine merge candidate list may be referred to as a subblock merge candidate list.

The affine inter mode may be referred to as an affine MVP mode. In the affine MVP mode, the CPMV of the current block may be derived based on a control point motion vector predictor (CPMVP) and a control point motion vector difference (CPMVD). In other words, the encoding apparatus may determine the CPMVP for the CPMV of the current block, derive a CPMVD which is a difference between the CPMV of the current block and the CPMVP, and signal information on the CPMVP and information on the CPMVD to the decoding apparatus. Here, the affine MVP mode may construct an affine MVP candidate list based on the neighboring block, and the information on the CPMVP may represent a neighboring block to be referred to in order to derive the CPMVP for the CPMV of the current block on the affine MVP candidate list. The affine MVP candidate list may be referred to as a control point motion vector predictor candidate list.

For example, in case an affine inter mode of a 6-parameter affine motion model is applied, the current block may be encoded as described below.

Figure 8:
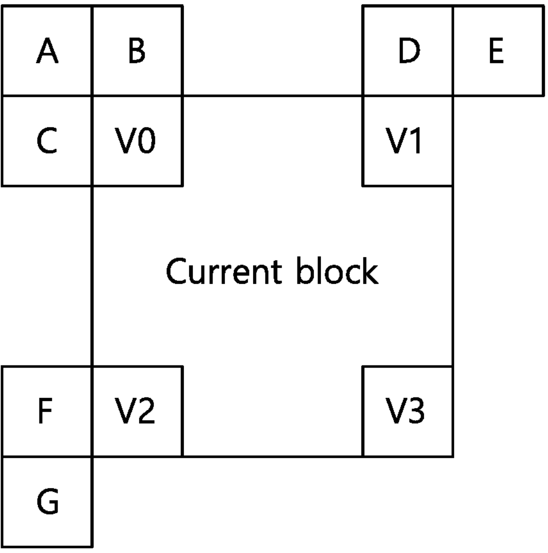
FIG. 8 is a diagram for describing a method for deriving a motion vector predictor at a control point according to an embodiment of the present disclosure.

FIG. 8 is a diagram for describing a method for deriving a motion vector predictor at a control point according to an embodiment of the present disclosure.

Referring to FIG. 8, a motion vector of CP0 of the current block may be expressed as v0, a motion vector of CP1 may be expressed as v1, a motion vector of a control point of a bottom-left sample position may be expressed as v2, and a motion vector of CP2 may be expressed as v3. More specifically, v0 may denote a CPMVP of CP0, v1 may denote a CPMVP of CP1, and v2 may denote a CPMVP of CP2.

An affine MVP candidate may be a combination of a CPMVP candidate of CP0, a CPMVP candidate of CP1, and a CPMVP candidate of CP2.

For example, the affine MVP candidate may be derived as described below.

More specifically, a maximum of 12 CPMVP candidate combinations may be determined according to the equation shown below.

$$\{(v_0, v_1, v_2) \mid v_0 = \{v_A, v_B, v_C\}, v_1 = \{v_D, v_E\}, v_2 = \{v_F, v_G\}\} \quad \text{[Equation 6]}$$

Herein, vA may denote a motion vector of neighboring block A, vB may denote a motion vector of neighboring block B, vC may denote a motion vector of neighboring block C, vD may denote a motion vector of neighboring block D, vE may denote a motion vector of neighboring block E, vF may denote a motion vector of neighboring block F, and vG may denote a motion vector of neighboring block G.

Additionally, the neighboring block A may represent a neighboring block positioned at the top-left of a top-left sample position of the current block, the neighboring block B may represent a neighboring block positioned at the top of the top-left sample position of the current block, and the neighboring block C may represent a neighboring block positioned at a left-side of the top-left sample position of the current block. Additionally, the neighboring block D may represent a neighboring block positioned at the top of a top-right sample position of the current block, and the neighboring block E may represent a neighboring block positioned at the top-right of the top-right sample position of the current block. And, the neighboring block F may represent a neighboring block positioned at a left-side of a bottom-left sample position of the current block, and the neighboring block G may represent a neighboring block positioned at the bottom-left of the bottom-left sample position of the current block.

More specifically, referring to the above-described Equation 6, the CPMVP candidate of CP0 may include motion vector vA of the neighboring block A, motion vector vB of the neighboring block B, and/or motion vector vC of the neighboring block C, the CPMVP candidate of CP1 may include motion vector vD of the neighboring block D, and/or motion vector vE of the neighboring block E, and the CPMVP candidate of CP2 may include motion vector vF of the neighboring block F, and/or motion vector vG of the neighboring block G.

In other words, CPMVP v0 of the CP0 may be derived based on a motion vector of at least one of neighboring blocks A, B, and C of the top-left sample position. Herein, neighboring block A may represent a block being positioned at a top-left of a top-left sample position of the current block, neighboring block B may represent a block being positioned at a top of the top-left sample position of the current block, and neighboring block C may represent a block being positioned at a left-side of the top-left sample position of the current block.

A combination of a maximum of 12 CPMVP candidates including CPMVP candidates of the CP0, CPMVP candidates of the CP1, and CPMVP candidates of the CP2 may be derived based on the motion vectors of the neighboring blocks.

Thereafter, the derived combination of CPMVP candidates may be aligned by order of candidates having lower DV values. Thus, the top 2 CPMVP candidate combinations may be derived as the affine MVP candidates.

The DV of a CPMVP candidate combination may be derived by using the following equation.

$$DV = |(v_{1x} - v_{0x})*h - (v2_y - v0_y)*w| + |(v1_y - v0_y)*h + (v2_x - v0_x)*w| \quad \text{[Equation 7]}$$

Thereafter, the encoding apparatus may determine CPMVs for each of the affine MVP candidates. Then, by comparing Rate Distortion (RD) costs for the CPMVs, affine MVP candidates having the lower RD costs may be selected as the optimal affine MVP candidates for the current block. The encoding apparatus may encode and signal indexes indicating the optimal candidates and CPMVDs.

Additionally, for example, in case the affine merge mode is applied, the current block may be encoded as described below.

Figure 9:
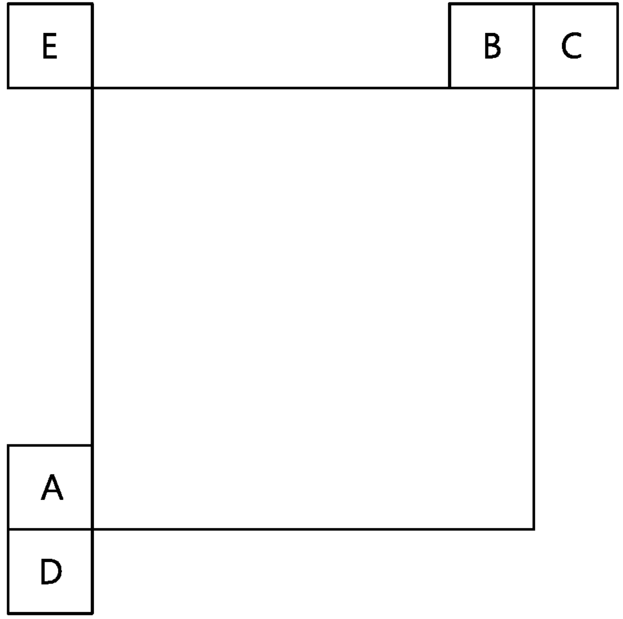
FIG. 9 is a diagram for describing a method for deriving a motion vector predictor at a control point according to an embodiment of the present disclosure.

FIG. 9 is a diagram for describing a method for deriving a motion vector predictor at a control point according to an embodiment of the present disclosure.

An affine merge candidate list of the current block may be constructed based on neighboring blocks of the current block shown in FIG. 9. The neighboring blocks may include neighboring block A, neighboring block B, neighboring block C, neighboring block D, and neighboring block E. And, the neighboring block A may denote a left neighboring block of the current block, the neighboring block B may denote a top neighboring block of the current block, the neighboring block C may denote a top-right corner neighboring block of the current block, the neighboring block D may denote a bottom-left corner neighboring block of the current block, and the neighboring block E may denote a top-left corner neighboring block of the current block.

For example, in case the size of the current block is W×H, and, in case, the x component of the top-left sample position of the current block is 0 and the y component is 0, the left neighboring block may be a block including a sample of coordinates (−1, H−1), the top neighboring block may be a block including a sample of coordinates (W−1, −1), the top-right corner neighboring block may be a block including a sample of coordinates (W, −1), the bottom-left corner neighboring block may be a block including a sample of coordinates (−1, H), and the top-left corner neighboring block may be a block including a sample of coordinates (−1, −1).

More specifically, for example, an encoding apparatus may scan neighboring block A, neighboring block B, neighboring block C, neighboring block D, and neighboring block E of the current block by a specific scanning order, and, in the scanning order, the neighboring block being the first to be encoded to the affine prediction mode may be determined as a candidate block of the affine merge mode, i.e., an affine merge candidate. Herein, for example, the specific scanning order ay be an alphabetical order. More specifically, the specific scanning order may be neighboring block A, neighboring block B, neighboring block C, neighboring block D, and neighboring block E.

Thereafter, the encoding apparatus may determine an affine motion model of the current block by using the determined candidate block, determine a CPMV of the current block based on the affine motion model, and determine an affine MVF of the current block based on the CPMV.

For example, in case neighboring block A is determined as the candidate block of the current block, neighboring block A may be coded as described below.

Figure 10:
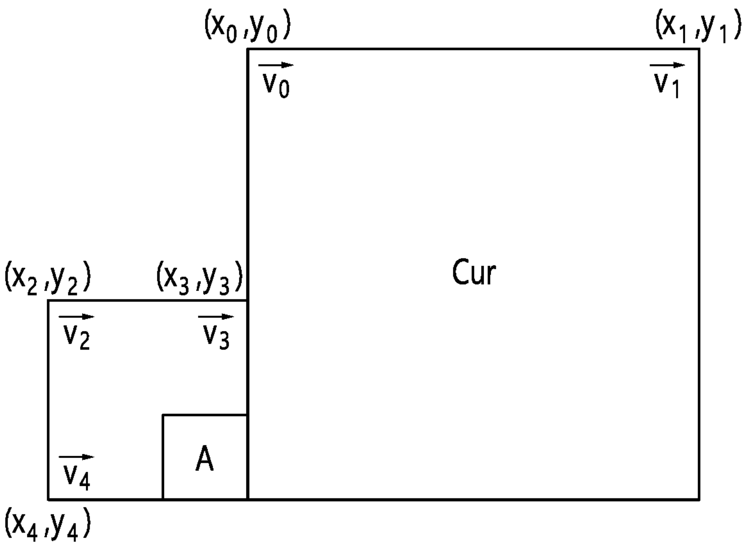
FIG. 10 illustrates an example of affine prediction being performed in a case where neighboring block A is selected as an affine merge candidate.

FIG. 10 illustrates an example of affine prediction being performed in a case where neighboring block A is selected as an affine merge candidate.

Referring to FIG. 10, an encoding apparatus may determine neighboring block A of the current block as a candidate block, and the encoding apparatus may derive an affine motion model of the current block based on CPMV, v2, and v3 of the neighboring block. Thereafter, the encoding apparatus may determine CPMV, v0, and v1 of the current block based on the affine motion model. The encoding apparatus may determine an affine MVF based on the CPMV, v0, and v1 of the current block and may perform an encoding process for the current block based on the affine MVF.

Meanwhile, with regard to the affine inter prediction, an inherited affine candidate and a constructed affine candidate are being considered for the affine mvp candidate list construction.

Here, the inherited affine candidate may be as follows.

For example, when the neighboring block of the current block is an affine block, and the reference picture of the current block is the same as the reference picture of the neighboring block, the affine mvp pair of the current block may be determined from the affine motion model of the neighboring block. Here, the affine block may represent a block to which the affine inter prediction is applied. The inherited affine candidate may represent CPMVPs (e.g., the affine mvp pair) which has been derived based on the affine motion model of the neighboring block.

Specifically, for example, the inherited affine candidate may be derived as described below.

Figure 11:
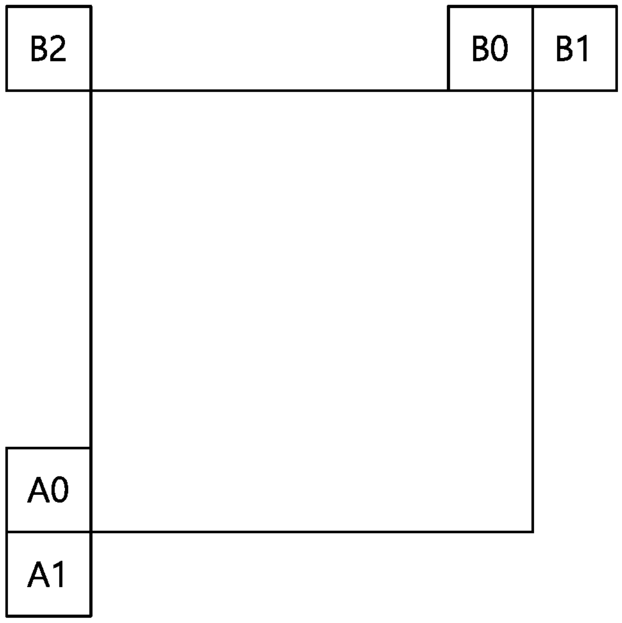
FIG. 11 illustratively represents neighboring blocks for deriving the inherited affine candidate.

FIG. 11 illustratively represents neighboring blocks for deriving the inherited affine candidate.

Referring to FIG. 11, the neighboring blocks of the current block may include a left neighboring block A0 of the current block, a bottom-left corner neighboring block A1 of the current block, a top neighboring block B0 of the current block, a top-right corner neighboring block B1 of the current block, and a top-left corner neighboring block B2 of the current block.

For example, if a size of the current block is W×H, and an x component of the top-left sample position of the current block is 0 and a y component thereof is 0, the left neighboring block may be a block including a sample at coordinates (−1, H−1); the top neighboring block, a block including a sample at coordinates (W−1, −1); the top-right corner neighboring block, a block including a sample at coordinates (W, −1); the bottom-left corner neighboring block, a block including a sample at coordinates (−1, H); and the top-left corner neighboring block, a block including a sample at coordinates (−1, −1).

The encoding apparatus/decoding apparatus may check the neighboring blocks A0, A1, B0, B1, and B2 sequentially, and, if the neighboring block has been coded using the affine motion model, and the reference picture of the current block is the same as the reference picture of the neighboring block, may derive two CPMVs or three CPMVs of the current block based on the affine motion model of the neighboring block. The CPMVs may be derived as an affine mvp candidate of the current block. The affine mvp candidate may represent the inherited affine candidate.

As one example, maximum two inherited affine candidates may be derived based on the neighboring blocks.

For example, the encoding apparatus/decoding apparatus may derive the first affine mvp candidate of the current block based on a first block in the neighboring blocks. Here, the first block may be coded with the affine motion model, and the reference picture of the first block may be the same as the reference picture of the current block. That is, the first block may be a block which has been first confirmed to satisfy a condition while checking neighboring blocks in a specific order. The condition may be that a block is coded with the affine motion model, and that a reference picture of a block is the same as a reference picture of the current block.

Hereinafter, the encoding apparatus/decoding apparatus may derive a second affine mvp candidate of the current block based on a second block in the neighboring blocks. Here, the second block may be coded with the affine motion model, and the reference picture of the second block may be the same as the reference picture of the current block. That is, the second block may be a block which has been second confirmed to satisfy a condition while checking neighboring blocks in a specific order. The condition may be that a block is coded with the affine motion model, and that a reference picture of a block is the same as a reference picture of the current block.

Meanwhile, for example, when the number of the available inherited affine candidates is less than two (that is, the number of derived inherited affine candidates is less than two), the constructed affine candidate may be considered. The constructed affine candidate may be derived as below.

Figure 12:
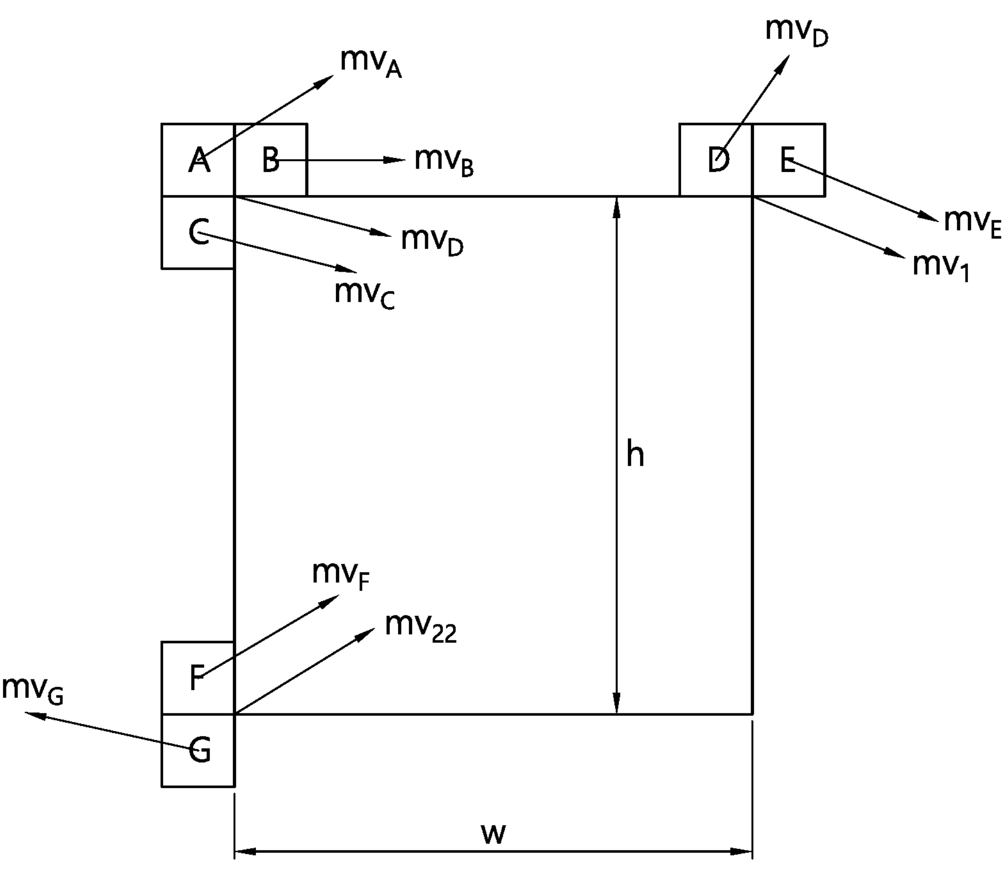
FIG. 12 illustratively represents a spatial candidate for the constructed affine candidate.

FIG. 12 illustratively represents a spatial candidate for the constructed affine candidate.

As shown in FIG. 12, motion vectors of the neighboring blocks of the current block may be divided into three groups. Referring to FIG. 12, the neighboring blocks may include a neighboring block A, a neighboring block B, a neighboring block C, a neighboring block D, a neighboring block E, a neighboring block F, and a neighboring block G.

The neighboring block A may represent a neighboring block located top left of a top-left sample position of the current block; the neighboring block B, a neighboring block located top of the top-left sample position of the current block; and the neighboring block C, a neighboring block located left of the top-left sample position of the current block. In addition, the neighboring block D may represent a neighboring block located top of a top-right sample position of the current block, and the neighboring block E may represent a neighboring block located top right of the top-right sample position of the current block. In addition, the neighboring block F may represent a neighboring block located left of a bottom-left sample position of the current block; and the neighboring block G may represent a neighboring block located bottom left of the bottom-left sample position of the current block.

For example, the three groups may include $S_0$, $S_1$, and $S_2$, and the $S_0$, the $S_1$ and the $S_2$ may be derived as following Table.

TABLE 1

| $S_0 = \{mv_A, mv_B, mv_C\}$ $S_1 = \{mv_D, mv_E\}$ $S_2 = \{mv_F, mv_G\}$ |
|---|

where $mv_A$ represents a motion vector of the neighboring block A; $mv_B$, a motion vector of the neighboring block B; $mv_C$, a motion vector of the neighboring block C; $mv_D$, a motion vector of the neighboring block D; $mv_E$, a motion vector of the neighboring block E; $mv_F$, a motion vector of the neighboring block F; and $mv_G$, a motion vector of the neighboring block G. The $S_0$ may be represented as a first group; the $S_1$, as a second group; and the $S_2$, as a third group.

The encoding apparatus/decoding apparatus may derive $mv_0$ from the $S_0$, may derive $mv_1$ from the $S_1$, may derive $mv_2$ from the $S_2$, and may derive the affine mvp candidate which includes the $mv_0$, the $mv_1$, and the $mv_2$. The affine mvp candidate may represent the constructed affine candidate. Further, the $mv_0$ may be a CPMVP candidate of CP0; the $mv_1$, a CPMVP candidate of CP1; and the $mv_2$, a CPMVP candidate of CP2.

Here, a reference picture for the $mv_0$ may be the same as a reference picture of the current block. That is, the $mv_0$ may be a motion vector which has been first confirmed to satisfy a condition while checking motion vectors in the $S_0$ in a specific order. The condition may be that the reference picture for the motion vector should be the same as the reference picture of the current block. The specific order may be the following one: the neighboring block A→the neighboring block B→the neighboring block C in the $S_0$.

Further, it may be performed in an order other than the forgoing order, and may not be limited to the forgoing example.

Further, the reference picture for the $mv_1$ may be the same as the reference picture of the current block. That is, the $mv_1$ may be a motion vector which has been first confirmed to satisfy a condition while checking motion vectors in the $S_1$ in a specific order. The condition may be that the reference picture for the motion vector should be the same as the reference picture of the current block. The specific order may be the following one: the neighboring block D→the neighboring block E in the $S_1$. Further, it may be performed in an order other than the forgoing order, and may not be limited to the forgoing example.

Further, the reference picture for the $mv_2$ may be the same as the reference picture of the current block. That is, the $mv_2$ may be a motion vector which has been first confirmed to satisfy a condition while checking motion vectors in the $S_2$ in a specific order. The condition may be that the reference picture for the motion vector should be the same as the reference picture of the current block. The specific order may be the following one: the neighboring block F→the neighboring block G in the $S_2$. Further, it may be performed in an order other than the forgoing order, and may not be limited to the forgoing example.

Meanwhile, when only the $mv_0$ and the $mv_1$ are available, that is, when only the $mv_0$ and the $mv_1$ are derived, the $mv_2$ may be derived as the following equation.

$$\overline{mv_2^x} = \overline{mv_0^x} - h\frac{(\overline{mv_1^y} - \overline{mv_0^y})}{w},\ \overline{mv_2^y} = \overline{mv_0^y} + h\frac{(\overline{mv_1^x} - \overline{mv_0^x})}{w} \quad \text{[Equation 8]}$$

where $mv_2^x$ represents an x component of the $mv_2$; $mv_2^y$, a y component of the $mv_2$; $mv_0^x$, an x component of the $mv_0$; $mv_0^y$, a y component of the $mv_0$; $mv_1^x$, an x component of the $mv_1$; and $mv_1^y$, a y component of the $mv_1$. Further, w represents the width of the current block, and h represents the height of the current block.

Meanwhile, when only the $mv_0$ and the $mv_2$ are derived, the $mv_1$ may be derived as the following equation.

$$\overline{mv_1^x} = \overline{mv_0^x} + h\frac{(\overline{mv_2^y} - \overline{mv_0^y})}{w},\ \overline{mv_1^y} = \overline{mv_0^y} - h\frac{(\overline{mv_2^x} - \overline{mv_0^x})}{w} \quad \text{[Equation 9]}$$

where $mv_1^x$ represents an x component of the $mv_1$; $mv_1^y$, a y component of the $mv_1$; $mv_0^x$, an x component of the $mv_0$; $mv_0^y$, a y component of the $mv_0$; $mv_2^x$, an x component of the $mv_2$; and $mv_2^y$, a y component of the $mv_2$. Further, w represents the width of the current block, and h represents the height of the current block.

Further, when the number of the available inherited affine candidate and/or the constructed affine candidate is less than two, the AMVP process of the conventional HEVC standard may be applied to the affine mvp list construction. That is, when the number of the available inherited affine candidate and/or the constructed affine candidate is less than two, the process to construct an mvp candidate in the conventional HEVC standard may be performed.

Meanwhile, the flow charts of examples of constructing the foregoing affine mvp list are as described later.

Figure 13:
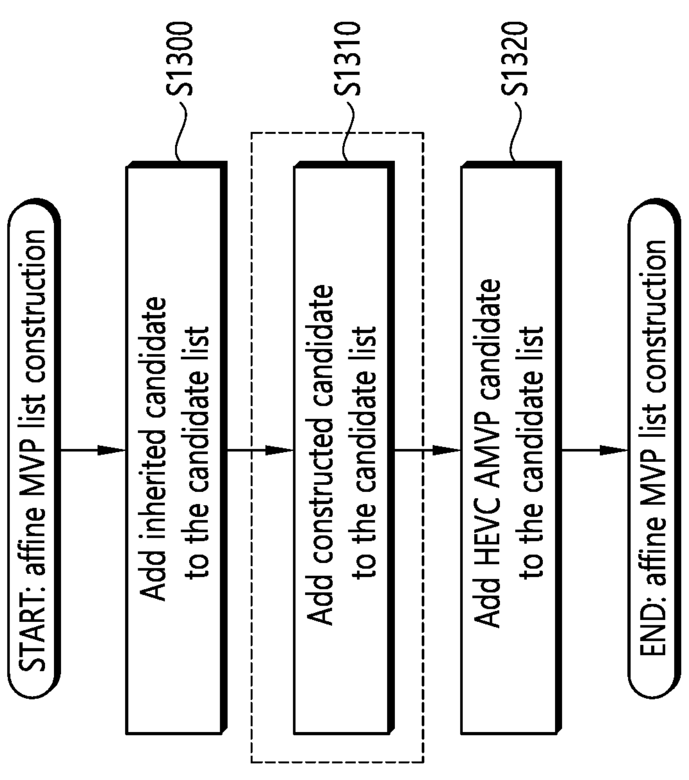
FIG. 13 illustratively represents an example of constructing an affine mvp list.

FIG. 13 illustratively represents an example of constructing an affine mvp list.

Referring to FIG. 13, the encoding apparatus/decoding apparatus may add the inherited candidate to the affine mvp list of the current block (S1300). The inherited candidate may represent the foregoing inherited affine candidate.

Specifically, the encoding apparatus/decoding apparatus may derive the maximum two inherited affine candidates from neighboring blocks of the current block. Here, the neighboring blocks may include a left neighboring block A0, a bottom-left corner neighboring block A1, a top neighboring block B0, a top-right corner neighboring block B1, and a top-left corner neighboring block B2 of the current block.

For example, the encoding apparatus/decoding apparatus may derive the first affine mvp candidate of the current block based on a first block in the neighboring blocks. Here, the first block may be coded with the affine motion model, and the reference picture of the first block may be the same as the reference picture of the current block. That is, the first block may be a block which has been first confirmed to satisfy a condition while checking neighboring blocks in a specific order. The condition may be that a block is coded with the affine motion model, and that a reference picture of a block is the same as a reference picture of the current block.

Hereinafter, the encoding apparatus/decoding apparatus may derive a second affine mvp candidate of the current block based on a second block in the neighboring blocks. Here, the second block may be coded with the affine motion model, and the reference picture of the second block may be the same as the reference picture of the current block. That is, the second block may be a block which has been second confirmed to satisfy a condition while checking neighboring blocks in a specific order. The condition may be that a block is coded with the affine motion model, and that a reference picture of a block is the same as a reference picture of the current block.

Meanwhile, the specific order may be like this: the left neighboring block A0→the bottom-left corner neighboring block A1→the top neighboring block B0→the top-right corner neighboring block B1→the top-left corner neighboring block B2. Further, it may be performed in an order other than the forgoing order, and may not be limited to the forgoing example.

The encoding apparatus/decoding apparatus may add the constructed candidate to the affine mvp list of the current block (S1310). The constructed candidate may represent the foregoing constructed affine candidate. The constructed candidate may be represented as the constructed affine mvp candidate. When the number of the available inherited candidates is less than two, the encoding apparatus/decoding apparatus may add the constructed candidate to the affine mvp list of the current block.

Meanwhile, the method of deriving the constructed affine candidate may be different depending on whether the affine motion model applied to the current block is a 6-affine motion model or a 4-affine motion model. Specific contents for the method of deriving the constructed candidate will be described later.

The encoding apparatus/decoding apparatus may add the HEVC AMVP candidate to the affine mvp list of the current block (S1320). When the number of the available inherited candidate and/or the constructed candidate is less than two, the encoding apparatus/decoding apparatus may add the HEVC AMVP candidate to the affine mvp list of the current block. That is, when the number of the available inherited candidate and/or the constructed candidate is less than two, the encoding apparatus and/or the decoding apparatus may perform the process to construct an mvp candidate in the conventional HEVC standard.

Meanwhile, a method of deriving the constructed candidate may be as follows.

Figure 14:
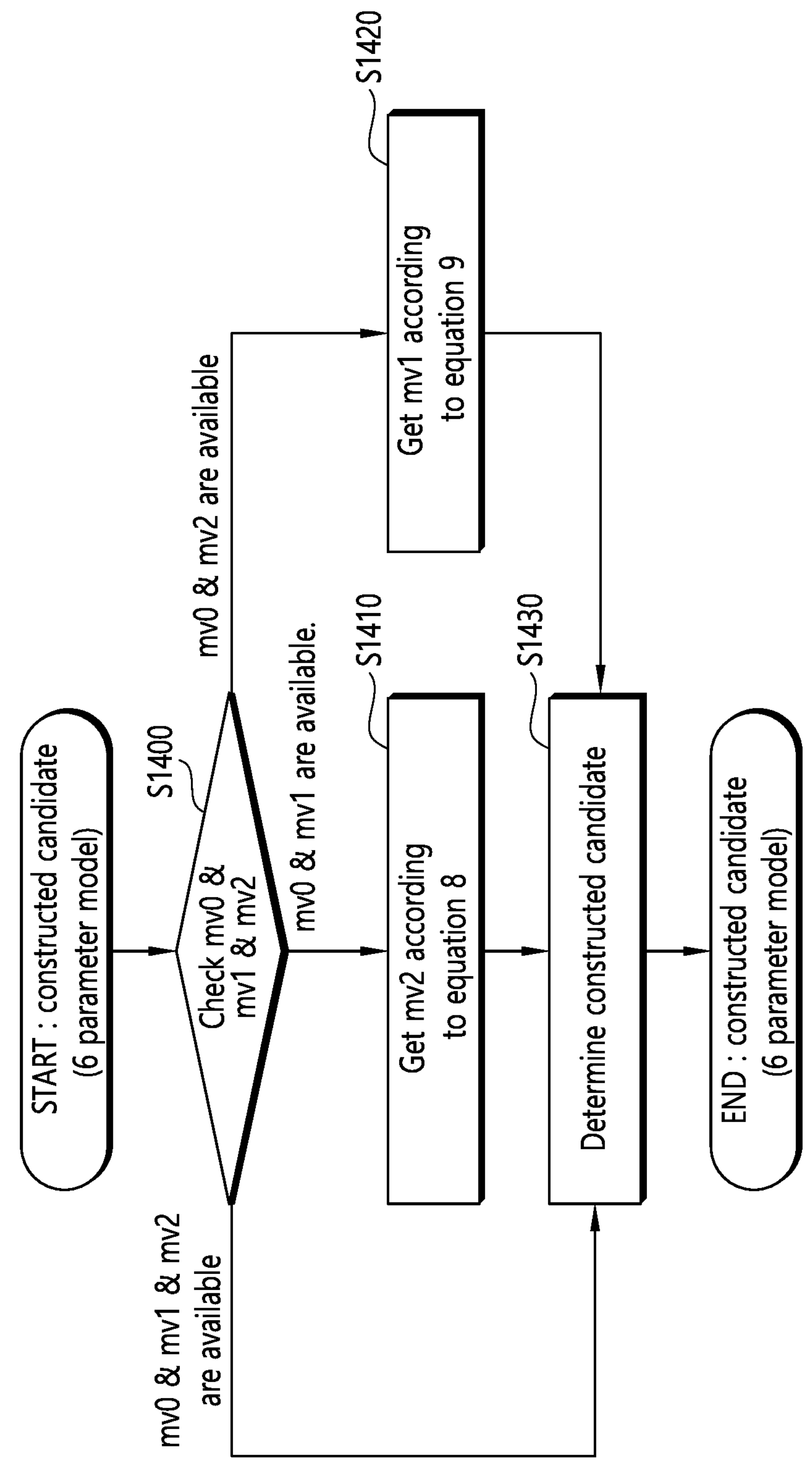
FIG. 14 represents an example of deriving the constructed candidate.

For example, when the affine motion model applied to the current block is the 6-affine motion model, the constructed candidate may be derived as in an example shown in FIG. 14.

FIG. 14 represents an example of deriving the constructed candidate.

Referring to FIG. 14, the encoding apparatus/decoding apparatus may check $mv_0$, $mv_1$, and $mv_2$ for the current block (S1400). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2. Further, the $mv_0$, the $mv_1$, and the $mv_2$ may be represented to be candidate motion vectors of the CPs.

For example, the encoding apparatus/decoding apparatus may check motion vectors of the neighboring blocks in a first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only the $mv_0$ and the mv for the current block are available, that is, when only the $mv_0$ and the $mv_1$ for the current block are derived, the encoding apparatus/decoding apparatus may derive $mv_2$ for the current block based on forgoing Equation 8 (S1410). The encoding apparatus/decoding apparatus may derive the $mv_2$ by substituting the derived $mv_0$ and the $mv_1$ in forgoing Equation 8.

When only the $mv_0$ and the $mv_2$ for the current block are available, that is, when only the $mv_0$ and the $mv_2$ for the current block are derived, the encoding apparatus/decoding apparatus may derive $mv_1$ for the current block based on forgoing Equation 9 (S1420). The encoding apparatus/decoding apparatus may derive the $mv_1$ by substituting the derived $mv_0$ and the $mv_2$ in forgoing Equation 9.

The encoding apparatus/decoding apparatus may derive the derived $mv_0$, $mv_1$ and $mv_2$ as the constructed candidate of the current block (S1430). When the $mv_0$, the $mv_1$ and the $mv_2$ are available, that is, when the $mv_0$, the $mv_1$ and the $mv_2$ are derived based on the neighboring block of the current block, the encoding apparatus/decoding apparatus may derive the derived $mv_0$, the $mv_1$ and the $mv_2$ as the constructed candidates of the current block.

Further, when only the mv0 and the mv1 for the current block are available, that is, when only the mv0 and the mv1 for the current block are derived, the encoding apparatus/decoding apparatus may derive as the constructed candidate of the current block the derived $mv_0$, the derived $mv_1$, and $mv_2$ derived based on forgoing Equation 8.

Further, when only the $mv_0$ and the $mv_2$ for the current block are available, that is, when only the $mv_0$ and the $mv_2$ for the current block are derived, the encoding apparatus/decoding apparatus may derive as the constructed candidate of the current block the derived $mv_0$, the derived $mv_2$, and mv1 derived based on forgoing Equation 9.

Figure 15:
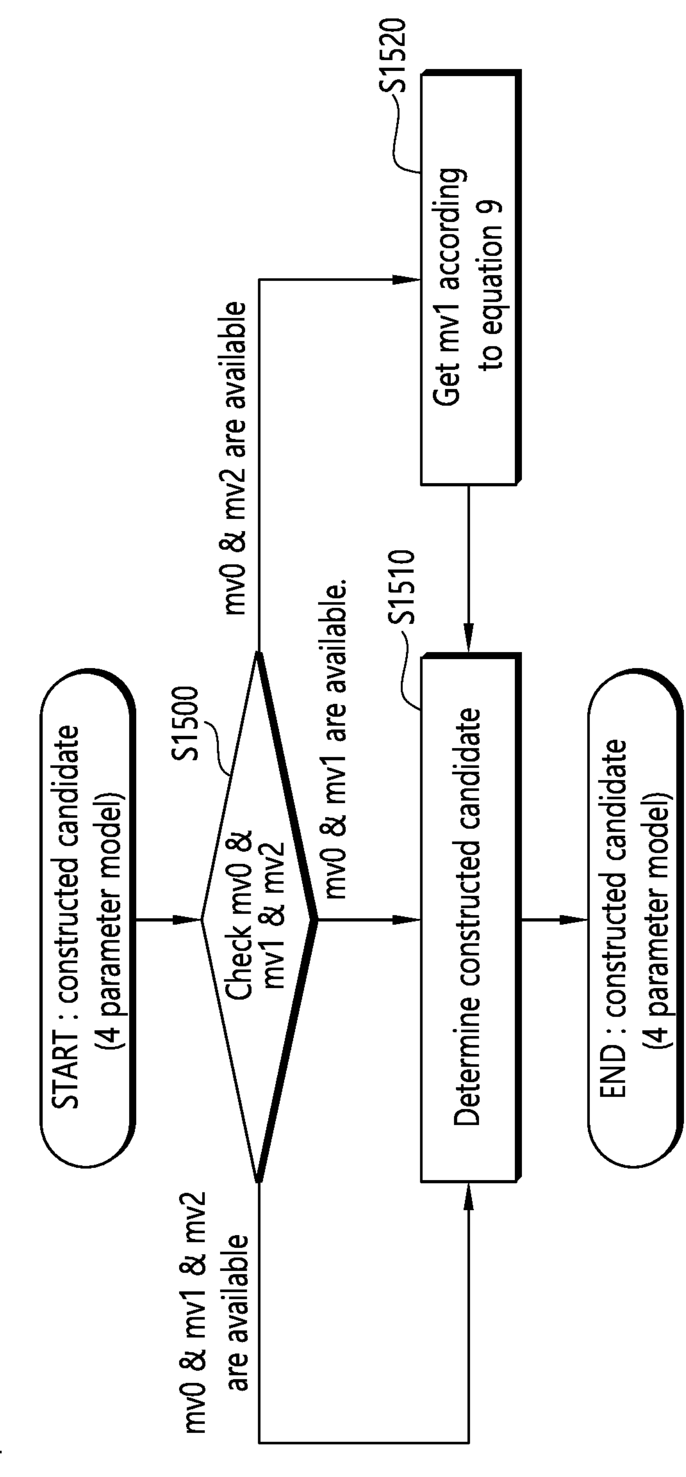
FIG. 15 represents an example of deriving the constructed candidate.

Further, for example, when the affine motion model applied to the current block is the 4-affine motion model, the constructed candidate may be derived as in an example shown in FIG. 15.

FIG. 15 represents an example of deriving the constructed candidate.

Referring to FIG. 15, the encoding apparatus/decoding apparatus may check $mv_0$, $mv_1$, and $mv_2$ for the current block (S1500). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

For example, the encoding apparatus/decoding apparatus may check motion vectors of the neighboring blocks in a first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only the $mv_0$ and the $mv_1$ for the current block are available or when the $mv_0$, the $mv_1$, and the $mv_2$ for the current block are available, that is, when only the $mv_0$ and the $mv_1$ for the current block are derived or when the $mv_0$, the $mv_1$, and the $mv_2$ for the current block are derived, the encoding apparatus/decoding apparatus may derive the derived $mv_0$ and the $mv_1$ as the constructed candidate of the current block (S1510).

Meanwhile, when only the $mv_0$ and the $mv_2$ for the current block are available, that is, when only the $mv_0$ and the $mv_2$ for the current block are derived, the encoding apparatus/decoding apparatus may derive $mv_1$ for the current block based on forgoing Equation 9 (S1520). The encoding apparatus/decoding apparatus may derive the $mv_1$ by substituting the derived $mv_0$ and the $mv_2$ in forgoing Equation 9.

After this, the encoding apparatus/decoding apparatus may derive the derived $mv_0$ and mv as the constructed candidate of the current block (S1510).

Meanwhile, the present disclosure proposes a method of deriving the constructed candidate, which is different from the above-described example. The proposed example can improve the coding performance by reducing the complexity when compared with the described-above example of deriving a constructed candidate. The proposed example is as described later. Further, when the number of the available inherited affine candidates is less than two (that is, the number of derived inherited affine candidates is less than two), the constructed affine candidate may be considered.

For example, the encoding apparatus/decoding apparatus may check $mv_0$, $mv_1$, and $mv_2$ for the current block. That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may determine whether available $mv_0$ exists in the first group, may determine whether available $mv_1$ exists in the second group, and may determine whether available $mv_2$ exists in the third group.

Specifically, the encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

After this, when the affine motion model applied to the current block is the 4-affine motion model, and when $mv_0$ and $mv_1$ for the current block are available, the encoding apparatus/decoding apparatus may derive the derived $mv_0$ and $mv_1$ as the constructed candidate of the current block. Meanwhile, when $mv_0$ and/or $mv_1$ for the current block are/is not available, that is, when at least one of $mv_0$ and $mv_1$ is not derived from the neighboring block of the current block, the encoding apparatus/decoding apparatus may not add the constructed candidate to the affine mvp list of the current block.

Further, when the affine motion model applied to the current block is the 6-affine motion model, and when $mv_0$, $mv_1$ and $mv_2$ for the current block are available, the encoding apparatus/decoding apparatus may derive the derived $mv_0$, $mv_1$, and $mv_2$ as the constructed candidate of the current block. Meanwhile, when $mv_0$, $mv_1$ and/or $mv_2$ for the current block are/is not available, that is, when at least one of $mv_0$, $mv_1$ and $mv_2$ is not derived from the neighboring block of the current block, the encoding apparatus/decoding apparatus may not add the constructed candidate to the affine mvp list of the current block.

The above-described proposed example is a method which considers as the constructed candidate only when all the motion vectors of CPs for generating an affine motion model of the current block. Here, the meaning of being available may represent that the reference picture of the neighboring block is the same as the reference picture of the current block. That is, the constructed candidate may be derived only when among motion vectors of the neighboring blocks for the respective CPs of the current block, there exists the motion vector satisfying the condition. Therefore, when the affine motion model applied to the current block is the 4-affine motion model, and only when MVs of CP0 and CP1 of the current block (that is, the $mv_0$ and the $mv_1$) are available, the constructed candidate may be considered. Therefore, when the affine motion model applied to the current block is the 6-affine motion model, and only when MVs of CP0, CP1, and CP2 of the current block (that is, the $mv_0$, the $mv_1$, and the $mv_2$) are available, the constructed candidate may be considered. Therefore, according to the proposed example, there may be no need for the additional construction of deriving the motion vector for the CP based on Equation 8 or 9. Through this, it is possible to reduce the computational complexity for deriving the constructed candidate. Further, since the constructed candidate is determined only when the CPMVP candidate having the same reference picture is available, it is possible to improve the overall coding performance.

Figure 16:
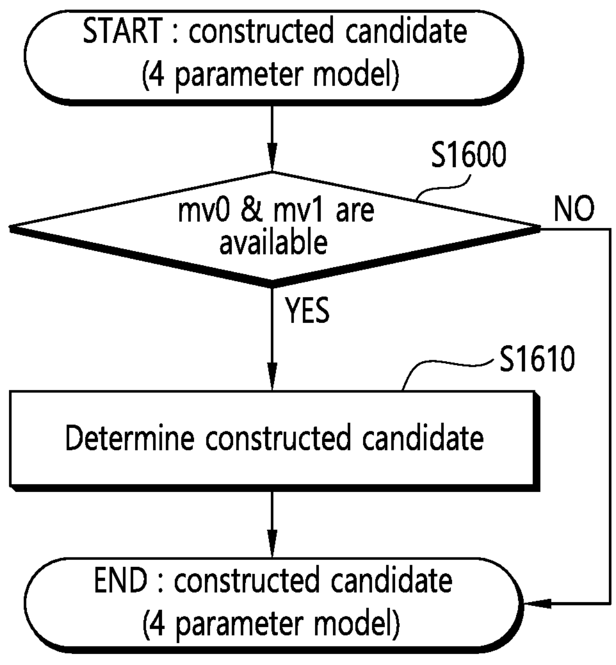
FIG. 16 represents an example of deriving the constructed candidate for a 4-affine motion model being applied to the current block.
Figure 17:
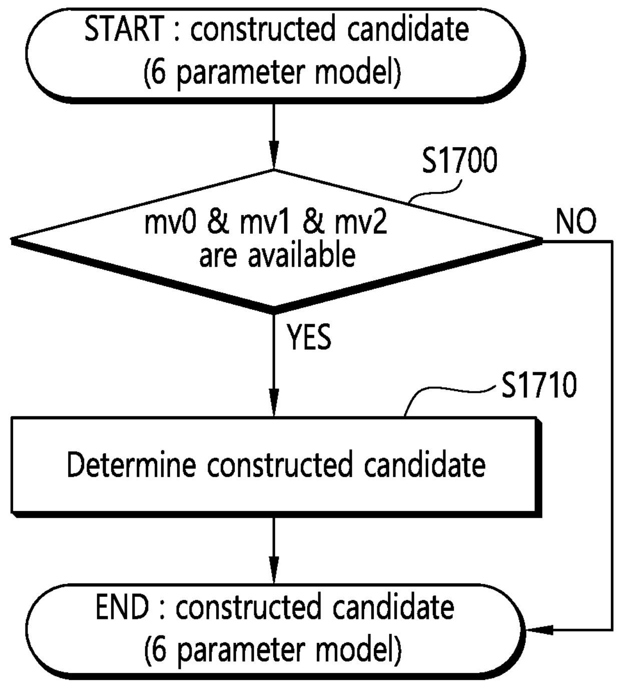
FIG. 17 represents an example of deriving the constructed candidate for a 6-affine motion model being applied to the current block.

The above-described example may be represented as in FIGS. 16 and 17.

FIG. 16 represents an example of deriving the constructed candidate for a 4-affine motion model being applied to the current block.

Referring to FIG. 16, the encoding apparatus/decoding apparatus may determine whether $mv_0$ and $mv_1$ for the current block are available (S1600). That is, the encoding apparatus/decoding apparatus may determine whether available $mv_0$ and $mv_1$ exist in the neighboring blocks of the current block. Here, the $mv_0$ may be a CPMVP candidate of CP0 of the current block, and the $mv_1$ may be a CPMVP candidate of CP1.

The encoding apparatus/decoding apparatus may determine whether available $mv_0$ exists in the first group, and may determine whether available $mv_1$ exists in the second group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

When the $mv_0$ and the $mv_1$ for the current block are available, that is, when the $mv_0$ and the $mv_1$ for the current block are derived, the encoding apparatus/decoding apparatus may derive as the constructed candidate of the current block the derived $mv_0$ and $mv_1$ (S1610). Meanwhile, when $mv_0$ and/or $mv_1$ for the current block are/is not available, that is, when at least one of $mv_0$ and $mv_1$ is not derived from the neighboring block of the current block, the encoding apparatus/decoding apparatus may not add the constructed candidate to the affine mvp list of the current block.

FIG. 17 represents an example of deriving the constructed candidate for a 6-affine motion model being applied to the current block.

Referring to FIG. 17, the encoding apparatus/decoding apparatus may determine whether $mv_0$, $mv_1$ and $mv_2$ for the current block are available (S1700). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

The encoding apparatus/decoding apparatus may determine whether available $mv_0$ exists in the first group, may determine whether available $mv_1$ exists in the second group, and may determine whether available $mv_2$ exists in the third group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

When the $mv_0$, the $mv_1$, and the $mv_2$ for the current block are available, that is, when the $mv_0$, the $mv_1$, and the $mv_2$ for the current block are derived, the encoding apparatus/decoding apparatus may derive the derived $mv_0$, $mv_1$, and $mv_2$ as the constructed candidate of the current block (S1710). Meanwhile, when $mv_0$, $mv_1$ and/or $mv_2$ for the current block are/is not available, that is, when at least one of $mv_0$, $mv_1$ and $mv_2$ is not derived from the neighboring block of the current block, the encoding apparatus/decoding apparatus may not add the constructed candidate to the affine mvp list of the current block.

Further, the present disclosure proposes an example of deriving a constructed candidate as described later. Specifically, in the example described later, CPs for generating the 4-affine motion model may be adaptively determined based on a width and a height of the current block. That is, when the affine motion model applied to the current block is the 4-affine motion model, two CPs may be selected from among CP0, CP1 and CP2 of the current block based on the width and the height of the current block.

For example, CPs of the current block may be selected as the following Table.

TABLE 2

| |
|---|
| {CP0, CP1} if width ≥ height |
| {CP0, CP2} if width < height |

Referring to Table 2, when the width of the current block is equal to or greater than the height thereof, CPs of the affine motion model for the current block may be selected to be CP0 and CP1. Further, when the width of the current block is less than the height thereof, CPs of the affine motion model for the current block may be selected to be CP0 and CP2.

Figure 18:
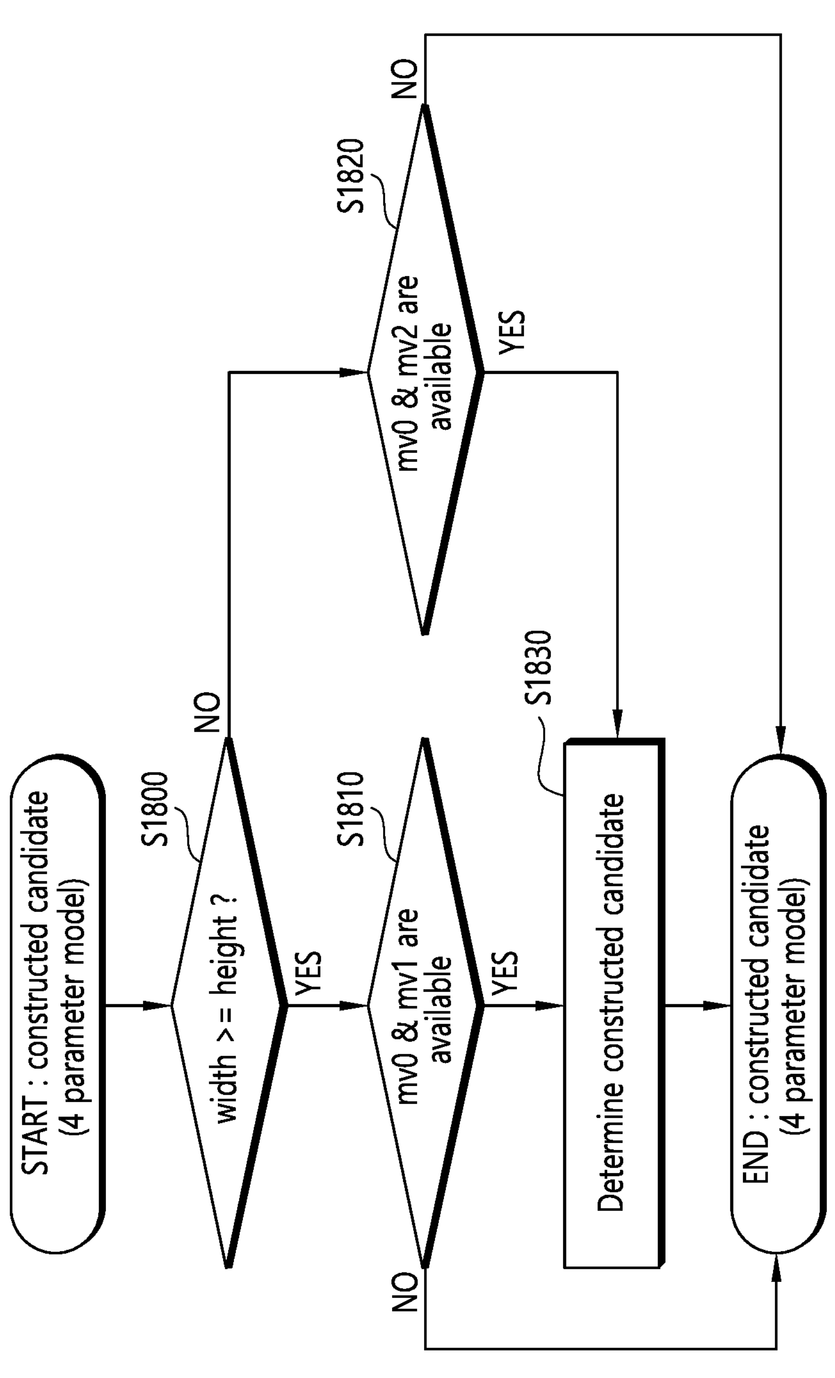
FIG. 18 represents an example of deriving a constructed candidate including CPMVPs for CPs adaptively selected based on the width and the height of the current block.

FIG. 18 represents an example of deriving a constructed candidate including CPMVPs for CPs adaptively selected based on the width and the height of the current block.

Referring to FIG. 18, when the 4-affine motion model is applied to the current block, the encoding apparatus/decoding apparatus may determine whether the width of the current block is equal to or greater than the height thereof (S1800). When the width of the current block is equal to or greater than the height thereof, the encoding apparatus/decoding apparatus may select CPs of the affine motion model for the current block to be CP0 and CP1. Further, when the width of the current block is less than the height thereof, the encoding apparatus/decoding apparatus may select CPs of the affine motion model for the current block to be CP0 and CP1.

When the width of the current block is equal to or greater than the height thereof, the encoding apparatus/decoding apparatus may determine whether $mv_0$ and $mv_1$ for the current block are available (S1810). That is, the encoding apparatus/decoding apparatus may determine whether available $mv_0$ and $mv_1$ exist in the neighboring blocks of the current block. Here, the $mv_0$ may be a CPMVP candidate of CP0 of the current block, and the $mv_1$ may be a CPMVP candidate of CP1.

The encoding apparatus/decoding apparatus may determine whether available $mv_0$ exists in the first group, and may determine whether available mv exists in the second group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Meanwhile, when the width of the current block is less than the height thereof, it may be determined whether $mv_0$ and $mv_2$ for the current block are available (S1820). That is, the encoding apparatus/decoding apparatus may determine whether available $mv_0$ and $mv_2$ exist in the neighboring blocks of the current block. Here, the $mv_0$ may be a CPMVP candidate of CP0 of the current block, and the $mv_2$ may be a CPMVP candidate of CP2.

The encoding apparatus/decoding apparatus may determine whether available $mv_0$ exists in the first group, and may determine whether available $mv_2$ exists in the third group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

The encoding apparatus/decoding apparatus may determine the constructed candidate of the current block based on the derived motion vectors (S1830). For example, when $mv_0$ for the CP0 and $mv_1$ for the CP1 are derived, the encoding apparatus/decoding apparatus may determine the $mv_0$ and the $mv_1$ as the constructed candidate. Further, for example, when $mv_0$ for the CP0 and $mv_2$ for the CP2 are derived, the encoding apparatus/decoding apparatus may determine the $mv_0$ and the $mv_2$ as the constructed candidate.

Meanwhile, when the 6-affine motion model is applied to the current block, and when CPMVPs for the CP0, the CP1, and the CP2 (that is, $mv_0$, $mv_1$, $mv_2$) are all available, the constructed candidate may be considered.

Further, the present disclosure proposes an example of deriving a constructed candidate as described later. Specifically, an example to be described later may be applied in deriving a constructed candidate of a current block when a method of adaptively selecting CP is not considered.

Figure 19:
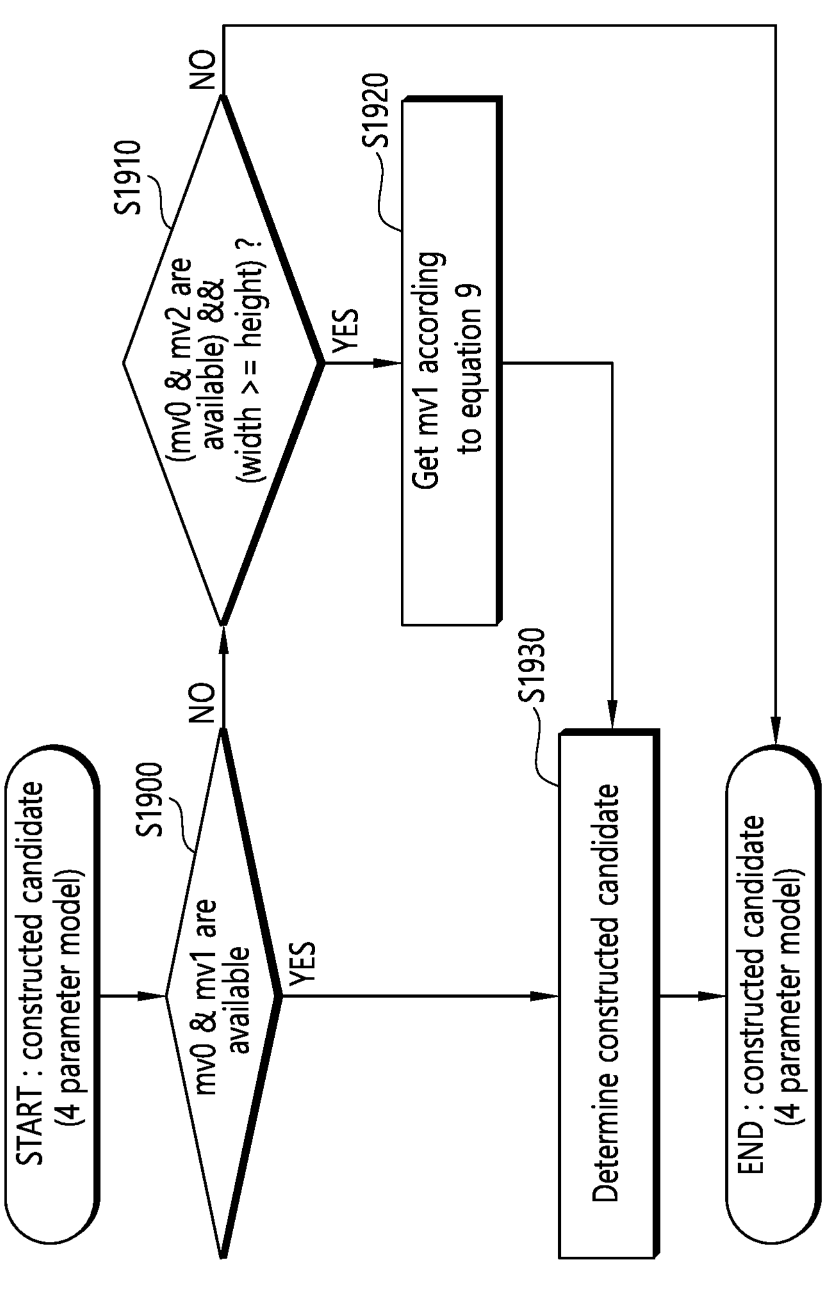
FIG. 19 represents an example of deriving a constructed candidate of a current block.

FIG. 19 represents an example of deriving a constructed candidate of a current block.

The encoding apparatus/decoding apparatus may determine whether $mv_0$ and $mv_1$ for the current block are available (S1900). When the 4-affine motion model is applied to the current block, the encoding apparatus/decoding apparatus may determine whether available $mv_0$ and $mv_1$ exist in the neighboring blocks of the current block. Here, the $mv_0$ may be a CPMVP candidate of CP0 of the current block, and the $mv_1$ may be a CPMVP candidate of CP1.

The encoding apparatus/decoding apparatus may determine whether available $mv_0$ exists in the first group, and may determine whether available $mv_1$ exists in the second group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

When $mv_0$ and/or $mv_1$ for the current block are/is not available, that is, when at least one of $mv_0$ and $mv_1$ is not derived from the neighboring block of the current block, the encoding apparatus/decoding apparatus may determine whether the $mv_0$ and the $mv_2$ for the current block are available, and whether the width of the current block is less than the height thereof (S1910).

For example, the encoding apparatus/decoding apparatus may determine whether available $mv_0$ exists in the first group, and may determine whether available $mv_2$ exists in the third group. Here, the $mv_0$ may be a CPMVP candidate of CP0 of the current block, and the $mv_2$ may be a CPMVP candidate of CP2.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

Further, the encoding apparatus/decoding apparatus may determine whether the width of the current block is less than the height thereof.

When the $mv_0$ and the $mv_2$ for the current block are available, and when the width of the current block is less than the height thereof, the encoding apparatus/decoding apparatus may derive $mv_1$ for the current block based on forgoing Equation 9 (S1920). When the $mv_0$ and the $mv_2$ for the current block are available, and when the width of the current block is less than the height thereof, the encoding apparatus/decoding apparatus may derive the mv by substituting the derived vm0 and the $mv_2$ in forgoing Equation 9. Meanwhile, when at least one of the $mv_0$ and the $mv_2$ for the current block is not available, or when the width of the current block is not less than the height of the current block, the constructed candidate of the current block may not be derived.

After this, the encoding apparatus/decoding apparatus may derive the derived $mv_0$ and $mv_1$ as the constructed candidate of the current block (S1930).

Figure 20:
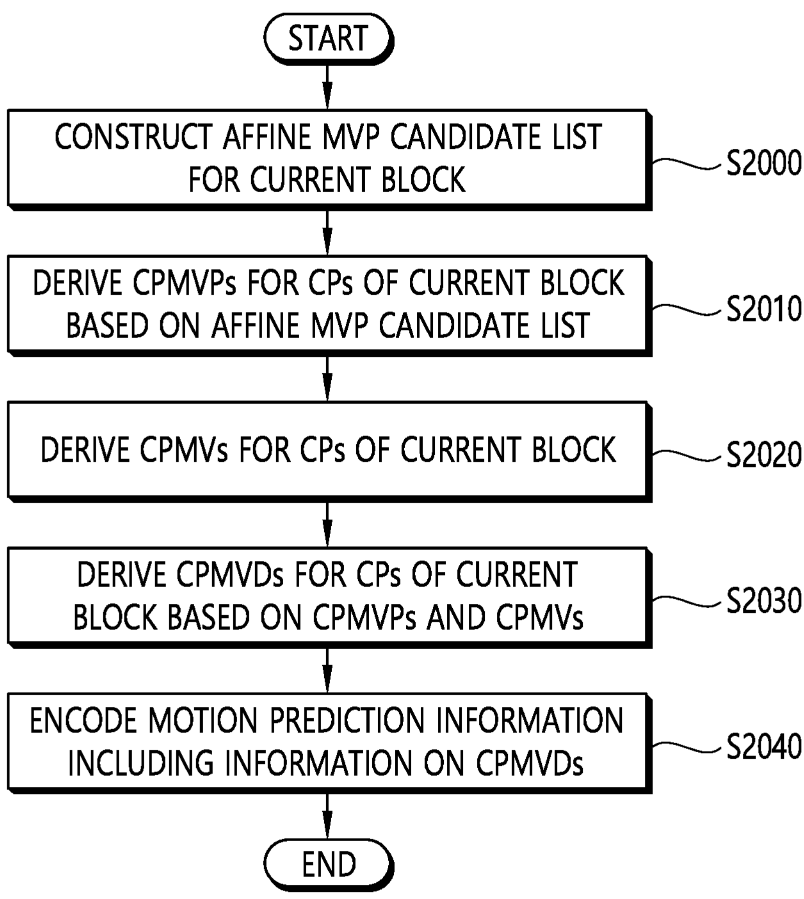
FIG. 20 schematically represents an image encoding method by an encoding apparatus according to the present disclosure.

FIG. 20 schematically represents an image encoding method by an encoding apparatus according to the present disclosure. The method disclosed in FIG. 20 may be performed by the encoding apparatus disclosed in FIG. 1. Specifically, for example, S2000 to S2030 of FIG. 20 may be performed by the predictor of the encoding apparatus, and S2040 may be performed by the entropy encoder of the encoding apparatus. Further, although not shown, the process of deriving prediction samples for the current block based on the CPMVs may be performed by the predictor of the encoding apparatus; the process of deriving the residual sample for the current block based on the prediction sample and the original sample for the current block, by the subtractor of the encoding apparatus; the process of generating information on residual for the current block based on the residual sample, by the transformer of the encoding apparatus; and the process of encoding the information on residual, by the entropy encoder of the encoding apparatus.

The encoding apparatus constructs an affine motion vector predictor (mvp) candidate list for the current block (S2000). The encoding apparatus may construct the affine mvp candidate list including the affine mvp candidate for the current block.

As one example, when a constructed affine mvp candidate is available, the affine mvp candidate list may include the constructed affine mvp candidate. Here, the constructed affine mvp candidate may include candidate motion vectors for the CPs. The constructed affine mvp candidate may be available when all the candidate motion vectors are available.

For example, when the 4-affine motion model is applied to the current block, the CPs of the current block may include CP0 and CP1. When the motion vector for the CP0 is available and the motion vector for the CP1 is available, the constructed affine mvp candidate may be available, and the affine mvp candidate list may include the constructed affine mvp candidate. Here, the CP0 may represent a top-left position of the current block, and the CP1 may represent a top-right position of the current block.

The constructed affine mvp candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

Meanwhile, when at least one of the candidate motion vector of the CP0 and the candidate motion vector of the CP1 is not available, the constructed affine mvp candidate may not be available.

Alternatively, for example, when the 6-affine motion model is applied to the current block, the CPs of the current block may include CP0, CP1 and CP2. When the motion vector for the CP0 is available and the motion vector for the CP1 is available and the motion vector for the CP2 is available, the constructed affine mvp candidate may be available, and the affine mvp candidate list may include the constructed affine mvp candidate. Here, the CP0 may represent a top-left position of the current block; the CP1, a top-right position of the current block; and the CP2, a bottom-left position of the current block.

The constructed affine mvp candidate may include the candidate motion vector for the CP0, the candidate motion vector for the CP1, and the candidate motion vector for the CP2. The candidate motion vector for the CP0 may be a motion vector of a first block; the candidate motion vector for the CP1, a motion vector of a second block; and the candidate motion vector for the CP2, a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Meanwhile, when at least one of the candidate motion vector of the CP0, the candidate motion vector of the CP1, and the candidate motion vector of CP2 is not available, the constructed affine mvp candidate may not be available.

Further, for example, when the 4-affine motion model is applied to the current block, the CPs may selected based on the width and the height of the current block, and the constructed affine mvp candidate may include candidate motion vectors for the selected CPs.

For example, when the width of the current block is equal to or greater than the height thereof, the CPs of the current block may include CP0 and CP1. When the motion vector for the CP0 is available and the motion vector for the CP1 is available, the constructed affine mvp candidate may be available, and the affine mvp candidate list may include the constructed affine mvp candidate. Here, the CP0 may represent a top-left position of the current block, and the CP1 may represent a top-right position of the current block.

The constructed affine mvp candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

When at least one of the candidate motion vector of the CP0 and the candidate motion vector of the CP1 is not available, the constructed affine mvp candidate may not be available.

Further, when the width of the current block is less than the height thereof, the CPs of the current block may include CP0 and CP2. When the motion vector for the CP0 is available and the motion vector for the CP2 is available, the constructed affine mvp candidate may be available, and the affine mvp candidate list may include the constructed affine mvp candidate. Here, the CP0 may represent a top-left position of the current block, and the CP2 may represent a bottom-left position of the current block.

The constructed affine mvp candidate may include a candidate motion vector for the CP0 and a candidate motion vector for the CP2. The candidate motion vector for the CP0 may be a motion vector of a first block, and the candidate motion vector for the CP2 may be a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block F, the left neighboring block among the left neighboring blocks of the current block, which is located lowermost; and the neighboring block G, the bottom-left corner neighboring block of the current block.

When at least one of the candidate motion vector of the CP0 and the candidate motion vector of the CP2 is not available, the constructed affine mvp candidate may not be available.

Further, as an example, the affine mvp candidate list may include an inherited affine mvp candidate.

The inherited affine mvp candidate may be derived based on the specific block in the neighboring blocks of the current block. Here, the specific block may be coded with the affine motion model, and the reference picture of the specific block may be the same as the reference picture of the current block.

Here, the specific block may be a block which has been first confirmed to satisfy a condition while checking the neighboring blocks in a specific order. The condition may be that a block is coded with the affine motion model, and that a reference picture of a block is the same as a reference picture of the current block. For example, the encoding apparatus may check the neighboring blocks in the specific order whether it satisfies the condition, may derive a specific block which first satisfies the condition, and may derive the inherited affine mvp candidate based on the specific block.

Specifically, for example, the encoding apparatus may derive motion vectors for the CPs of the current block based on the affine motion model of the specific block, and may derive the inherited affine mvp candidate including the motion vectors as CPMVP candidates. The affine motion model may be derived as in foregoing Equation 1 or 3.

Here, the neighboring blocks may include a left neighboring block, a top neighboring block, a top-right neighboring block, a bottom-left neighboring block, and a top-left neighboring block of the current block. For example, if a size of the current block is W×H, and an x component of the top-left sample position of the current block is 0 and a y component thereof is 0, the left neighboring block may be a block including a sample at coordinates (−1, H−1); the top neighboring block, a block including a sample at coordinates (W−1, −1); the top-right neighboring block, a block including a sample at coordinates (W, −1); the bottom-left neighboring block, a block including a sample at coordinates (−1, H); and the top-left neighboring block, a block including a sample at coordinates (−1, −1).

Meanwhile, when the number of the affine mvp candidates which have been derived through the above-described process is less than two, the affine mvp candidates may include the mvp candidate in the conventional HEVC standard.

That is, for example, when the number of the affine mvp candidates which have been derived through the above-described process is less than two, the encoding apparatus may derive the mvp candidate in the conventional HEVC standard.

Meanwhile, the encoding apparatus may determine the affine motion model applied to the current block, and generate and encode affine type information indicating the affine motion model applied to the current block. For example, the affine type information may represent whether the affine motion model applied to the current block is a 6-affine motion model or a 4-affine motion model. The affine type Information may be signaled through the bitstream. The image information may include the affine type information.

The encoding apparatus derives control point motion vector predictors (CPMVPs) for control points (CPs) of the current block based on the affine mvp candidate list (S2010). The encoding apparatus may derive CPMVs for the CPs of the current block which has optimal RD cost, and may select as the affine mvp candidate for the current block the affine mvp candidate from among the affine mvp candidates, which is most similar to the CPMVs. The encoding apparatus may derive control point motion vector predictors (CPMVPs) for control points (CPs) of the current block based on the selected affine mvp candidate from among the affine mvp candidates included in the affine mvp candidate list. Specifically, when the affine mvp candidate includes the candidate motion vector for CP0 and the candidate motion vector for CP1, the candidate motion vector for CP0 of the affine mvp candidate may be derived as the CPMVP of the CP0, and the candidate motion vector for CP1 of the affine mvp candidate may be derived as the CPMVP of the CP1. Further, when the affine mvp candidate includes the candidate motion vector for CP0, the candidate motion vector for CP1, and the candidate motion vector for CP2, the candidate motion vector for CP0 of the affine mvp candidate may be derived as CPMVP of the CP0; the candidate motion vector for CP1 of the affine mvp candidate, as CPMVP of the CP1; and the candidate motion vector for CP2 of the affine mvp candidate, as CPMVP of the CP2. Further, when the affine mvp candidate includes the candidate motion vector for CP0 and the candidate motion vector for CP2, the candidate motion vector for CP0 of the affine mvp candidate may be derived as the CPMVP of the CP0, and the candidate motion vector for CP2 of the affine mvp candidate may be derived as the CPMVP of the CP2.

The encoding apparatus may encode an affine mvp candidate index indicating the selected affine mvp candidate from among the affine mvp candidates. The affine mvp candidate index may indicate the one affine mvp candidate among the affine mvp candidates included in the affine motion vector predictor (MVP) candidate list for the current block.

The encoding apparatus derives CPMVs for the CPs of the current block (S2020). The encoding apparatus may derive CPMVs for the respective CPs of the current block.

The encoding apparatus derives control point motion vector differences (CPMVDs) for the CPs of the current block based on the CPMVPs and the CPMVs (S2030). The encoding apparatus may derive CPMVDs for the CPs of the current block based on the CPMVPs and the CPMVs for the respective CPs.

The encoding apparatus encodes motion prediction information including information on the CPMVDs (S2040). The encoding apparatus may output, in the form of a bitstream, motion prediction information including information on the CPMVDs. That is, the encoding apparatus may output, in the form of a bitstream, image information including the motion prediction information. The encoding apparatus may encode information on CPMVD for the respective CPs, and the motion prediction information may include information on the CPMVDs.

Further, the motion prediction information may include the affine mvp candidate index. The affine mvp candidate index may indicate the selected affine mvp candidate among the affine mvp candidates included in the affine motion vector predictor (mvp) candidate list for the current block.

Meanwhile, as an example, the encoding apparatus may derive prediction samples for the current block based on the CPMVs, derive the residual sample for the current block based on prediction sample and original sample for the current block, generate information on residual for the current block based on the residual sample, and encode information on the residual. The image information may include information on the residual.

Meanwhile, the bitstream may be transmitted to the decoding apparatus through a network or a (digital) storage medium. Here, the network may include a broadcast network, a communication network and/or the like, and the digital storage medium may include various storage media such as USB, SD, CD, DVD, Blu-ray, HDD, SSD, and the like.

Figure 21:
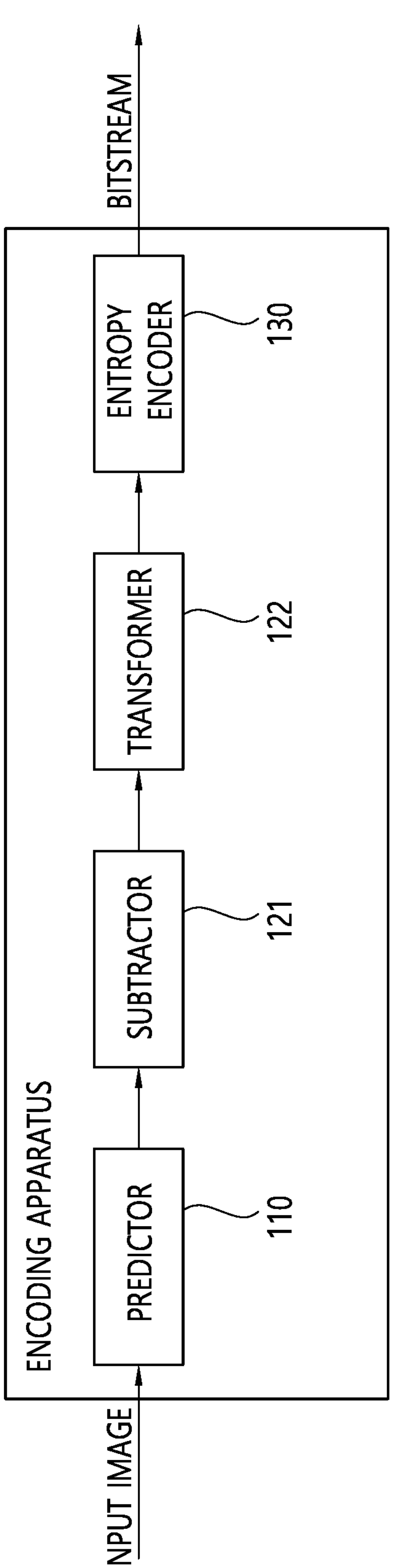
FIG. 21 schematically represents an encoding apparatus performing an image encoding method according to the present disclosure.

FIG. 21 schematically represents an encoding apparatus performing an image encoding method according to the present disclosure. The method disclosed in FIG. 20 may be performed by the encoding apparatus disclosed in FIG. 21. Specifically, for example, the predictor of the encoding apparatus of FIG. 21 may perform S2000 to S2030 of FIG. 20, and the entropy encoder of the encoding apparatus of FIG. 21 may perform S2040 of FIG. 20. Further, although not shown, the process of deriving prediction samples for the current block based on the CPMVs may be performed by the predictor of the encoding apparatus of FIG. 21; the process of deriving the residual sample for the current block based on the prediction sample and the original sample for the current block, by the subtractor of the encoding apparatus of FIG. 21; the process of generating information on residual for the current block based on the residual sample, by the transformer of the encoding apparatus of FIG. 21; and the process of encoding the information on residual, by the entropy encoder of the encoding apparatus of FIG. 21.

Figure 22:
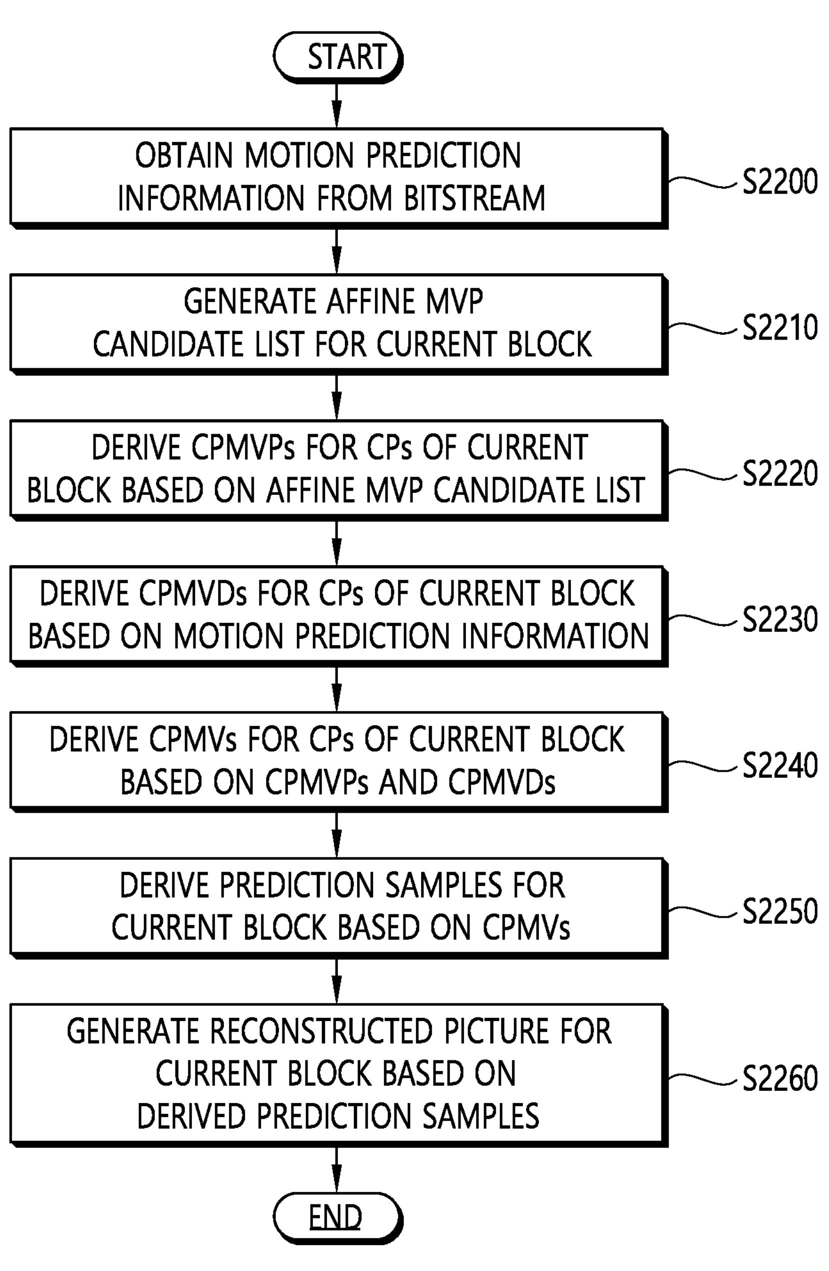
FIG. 22 schematically represents an image decoding method by a decoding apparatus according to the present disclosure.

FIG. 22 schematically represents an image decoding method by a decoding apparatus according to the present disclosure. The method disclosed in FIG. 22 may be performed by the decoding apparatus disclosed in FIG. 2. Specifically, for example, S2200 of FIG. 22 may be performed by the entropy decoder of the decoding apparatus; S2210 to S2250, by the predictor of the decoding apparatus; and S2260, by the adder of the decoding apparatus. Further, although not shown, the process of obtaining information on residual of the current block through a bitstream may be performed by the entropy decoder of the decoding apparatus, and the process of deriving the residual sample for the current block based on the residual information may be performed by the inverse transformer of the decoding apparatus.

The decoding apparatus obtains motion prediction information for a current block from a bitstream (S2200). The decoding apparatus may obtain image information including the motion prediction information from the bitstream.

Further, for example, the motion prediction information may include information on control point motion vector differences (CPMVDs) for control points (CPs) of the current block. That is, the motion prediction information may include information on CPMVD for respective CPs of the current block.

Further, for example, the motion prediction information may include the affine mvp candidate index for the current block. The affine mvp candidate index may indicate one among the affine mvp candidates included in the affine motion vector predictor (mvp) candidate list for the current block.

The decoding apparatus constructs an affine motion vector predictor (mvp) candidate list for the current block (S2210). The decoding apparatus may construct an affine mvp candidate list including the affine mvp candidate for the current block.

As one example, when a constructed affine mvp candidate is available, the affine mvp candidate list may include the constructed affine mvp candidate. Here, the constructed affine mvp candidate may include candidate motion vectors for the CPs. The constructed affine mvp candidate may be available when all the candidate motion vectors are available.

For example, when the 4-affine motion model is applied to the current block, the CPs of the current block may include CP0 and CP1. When the motion vector for the CP0 is available and the motion vector for the CP1 is available, the constructed affine mvp candidate may be available, and the affine mvp candidate list may include the constructed affine mvp candidate. Here, the CP0 may represent a top-left position of the current block, and the CP1 may represent a top-right position of the current block.

The constructed affine mvp candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

Meanwhile, when at least one of the candidate motion vector of the CP0 and the candidate motion vector of the CP1 is not available, the constructed affine mvp candidate may not be available.

Alternatively, for example, when the 6-affine motion model is applied to the current block, the CPs of the current block may include CP0, CP1 and CP2. When the motion vector for the CP0 is available and the motion vector for the CP1 is available and the motion vector for the CP2 is available, the constructed affine mvp candidate may be available, and the affine mvp candidate list may include the constructed affine mvp candidate. Here, the CP0 may represent a top-left position of the current block; the CP1, a top-right position of the current block; and the CP2, a bottom-left position of the current block.

The constructed affine mvp candidate may include the candidate motion vector for the CP0, the candidate motion vector for the CP1, and the candidate motion vector for the CP2. The candidate motion vector for the CP0 may be a motion vector of a first block; the candidate motion vector for the CP1, a motion vector of a second block; and the candidate motion vector for the CP2, a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Meanwhile, when at least one of the candidate motion vector of the CP0, the candidate motion vector of the CP1, and the candidate motion vector of CP2 is not available, the constructed affine mvp candidate may not be available.

Further, for example, when the 4-affine motion model is applied to the current block, the CPs may selected based on the width and the height of the current block, and the constructed affine mvp candidate may include candidate motion vectors for the selected CPs.

For example, when the width of the current block is equal to or greater than the height thereof, the CPs of the current block may include CP0 and CP1. When the motion vector for the CP0 is available and the motion vector for the CP1 is available, the constructed affine mvp candidate may be available, and the affine mvp candidate list may include the constructed affine mvp candidate. Here, the CP0 may represent a top-left position of the current block, and the CP1 may represent a top-right position of the current block.

The constructed affine mvp candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

When at least one of the candidate motion vector of the CP0 and the candidate motion vector of the CP1 is not available, the constructed affine mvp candidate may not be available.

Further, when the width of the current block is less than the height thereof, the CPs of the current block may include CP0 and CP2. When the motion vector for the CP0 is available and the motion vector for the CP2 is available, the constructed affine mvp candidate may be available, and the affine mvp candidate list may include the constructed affine mvp candidate. Here, the CP0 may represent a top-left position of the current block, and the CP2 may represent a bottom-left position of the current block.

The constructed affine mvp candidate may include a candidate motion vector for the CP0 and a candidate motion vector for the CP2. The candidate motion vector for the CP0 may be a motion vector of a first block, and the candidate motion vector for the CP2 may be a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and an x component of the top-left sample position of the current block is 0 and a y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block F, the left neighboring block among the left neighboring blocks of the current block, which is located lowermost; and the neighboring block G, the bottom-left corner neighboring block of the current block.

When at least one of the candidate motion vector of the CP0 and the candidate motion vector of the CP2 is not available, the constructed affine mvp candidate may not be available.

Further, as an example, the affine mvp candidate list may include an inherited affine mvp candidate.

The inherited affine mvp candidate may be derived based on the specific block in the neighboring blocks of the current block. Here, the specific block may be coded with the affine motion model, and the reference picture of the specific block may be the same as the reference picture of the current block.

Here, the specific block may be a block which has been first confirmed to satisfy a condition while checking the neighboring blocks in a specific order. The condition may be that a block is coded with the affine motion model, and that a reference picture of a block is the same as a reference picture of the current block. For example, the decoding apparatus may check the neighboring blocks in the specific order whether it satisfies the condition, may derive a specific block which first satisfies the condition, and may derive the inherited affine mvp candidate based on the specific block.

Specifically, for example, the decoding apparatus may derive motion vectors for the CPs of the current block based on the affine motion model of the specific block, and may derive the inherited affine mvp candidate including the motion vectors as CPMVP candidates. The affine motion model may be derived as in foregoing Equation 1 or 3.

Here, the neighboring blocks may include a left neighboring block, a top neighboring block, a top-right neighboring block, a bottom-left neighboring block, and a top-left neighboring block of the current block. For example, if a size of the current block is W×H, and an x component of the top-left sample position of the current block is 0 and a y component thereof is 0, the left neighboring block may be a block including a sample at coordinates (−1, H−1); the top neighboring block, a block including a sample at coordinates (W−1, −1); the top-right neighboring block, a block including a sample at coordinates (W, −1); the bottom-left neighboring block, a block including a sample at coordinates (−1, H); and the top-left neighboring block, a block including a sample at coordinates (−1, −1).

Meanwhile, when the number of the affine mvp candidates which have been derived through the above-described process is less than two, the affine mvp candidates may include the mvp candidate in the conventional HEVC standard.

That is, for example, when the number of the affine mvp candidates which have been derived through the above-described process is less than two, the decoding apparatus may derive the mvp candidate in the conventional HEVC standard.

Meanwhile, the affine motion model applied to the current block may be derived based on the affine type information. For example, the affine type information may represent the affine motion model applied to the current block. That is, the affine type information may represent whether the affine motion model applied to the current block is a 6-affine motion model or a 4-affine motion model. The affine type Information may be obtained through the bitstream. The image information may include the affine type information.

The decoding apparatus derives control point motion vector predictors (CPMVPs) for control points (CPs) of the current block based on the affine mvp candidate list (S2220).

The decoding apparatus may select a specific affine mvp candidate from among the affine mvp candidates included in the affine mvp candidate list, and may derive the selected affine mvp candidate as CPMVPs for the CPs of the current block. For example, the decoding apparatus may obtain the affine mvp candidate index for the current block from the bitstream, and may derive as CPMVPs for the CPs of the current block the affine mvp candidate among the affine mvp candidates included in the affine mvp candidate list, which the affine mvp candidate index indicates. Specifically, when the affine mvp candidate includes the candidate motion vector for CP0 and the candidate motion vector for CP1, the candidate motion vector for CP0 of the affine mvp candidate may be derived as the CPMVP of the CP0, and the candidate motion vector for CP1 of the affine mvp candidate may be derived as the CPMVP of the CP1. Further, when the affine mvp candidate includes the candidate motion vector for CP0, the candidate motion vector for CP1, and the candidate motion vector for CP2, the candidate motion vector for CP0 of the affine mvp candidate may be derived as CPMVP of the CP0; the candidate motion vector for CP1 of the affine mvp candidate, as CPMVP of the CP1; and the candidate motion vector for CP2 of the affine mvp candidate, as CPMVP of the CP2. Further, when the affine mvp candidate includes the candidate motion vector for CP0 and the candidate motion vector for CP2, the candidate motion vector for CP0 of the affine mvp candidate may be derived as the CPMVP of the CP0, and the candidate motion vector for CP2 of the affine mvp candidate may be derived as the CPMVP of the CP2.

The decoding apparatus derives control point motion vector differences (CPMVDs) for the CPs of the current block based on the motion prediction information (S2230). The motion prediction information may include information on CPMVD for the respective CPs, and the decoding apparatus may derive the CPMVD for the respective CPs of the current block based on information on the CPMVD for the respective CPs.

The decoding apparatus derives control point motion vectors (CPMVs) for the CPs of the current block based on the CPMVPs and the CPMVDs (S2240). The decoding apparatus may derive CPMV for each CP based on CPMVD and CPMVP for the respective CPs. For example, the decoding apparatus may derive CPMV for the CP by adding CPMVD and CPMVP for each CP.

The decoding apparatus derives the prediction samples for the current block based on the CPMVs (S2250). The decoding apparatus may derive motion vectors of subblock units or sample units of the current block based on the CPMVs. That is, the decoding apparatus may derive motion vector of each subblock or each sample of the current block based on the CPMVs. The motion vectors of the subblock units or the sample units may be derived based on above-described Equation 1 or Equation 3. The motion vectors may be represented as an affine motion vector field (MVF) or a motion vector array.

The decoding apparatus may derive prediction samples for the current block based on motion vectors of the subblock units or the sample units. The decoding apparatus may derive a reference area in a reference picture based on motion vectors of the subblock unit or the sample unit, and generate a prediction sample of the current block based on reconstructed sample in the reference area.

The decoding apparatus generates a reconstruction picture for the current block based on the derived prediction samples (S2260). The decoding apparatus may generate a reconstructed picture for the current block based on the derived prediction samples. The decoding apparatus may use a prediction sample directly as a reconstruction sample according to prediction mode, or may generate a reconstruction sample by adding a residual sample to the prediction sample. If there exists a residual sample for the current block, the decoding apparatus may obtain information on residual for the current block from the bitstream. The information on residual may include a transform coefficient relating to the residual sample. The decoding apparatus may derive the residual sample (or residual sample array) for the current block based on the residual information. The decoding apparatus may generate a reconstruction sample based on the prediction sample and the residual sample, and derive a reconstructed block or reconstructed picture based on the reconstruction sample. After this, as described above, the decoding apparatus may apply an in-loop filtering procedure such as an SAO procedure and/or deblocking filtering to the reconstructed picture in order to improve subjective/objective video quality as needed.

Figure 23:
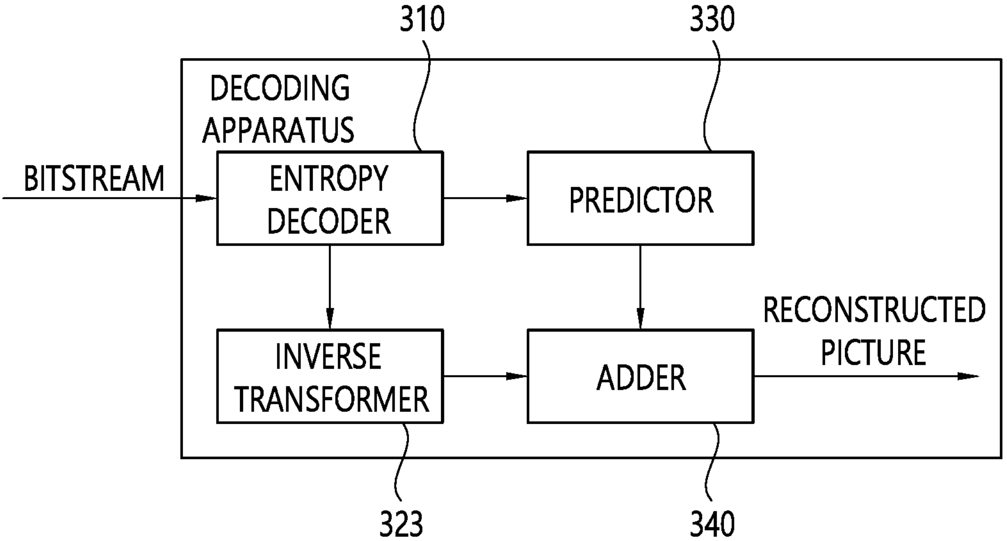
FIG. 23 schematically represents a decoding apparatus performing an image decoding method according to the present disclosure.

FIG. 23 schematically represents a decoding apparatus performing an image decoding method according to the present disclosure. The method disclosed in FIG. 22 may be performed by the decoding apparatus disclosed in FIG. 23. Specifically, for example, an entropy decoder of the decoding apparatus of FIG. 23 may perform S2200 of FIG. 22; a predictor of the decoding apparatus of FIGS. 23, S2210 to S2250 of FIG. 22; and an adder of the decoding apparatus of FIG. 23, S2260 of FIG. 22. Further, although not shown, the process of obtaining image information including information on residual of the current block through a bitstream may be performed by the entropy decoder of the decoding apparatus of FIG. 23, and the process of deriving the residual sample for the current block based on the residual information may be performed by the inverse transformer of the decoding apparatus of FIG. 23.

According to the above-described present disclosure, it is possible to increase the efficiency of image coding based on the affine motion prediction.

Further, according to the present disclosure, in deriving the affine mvp candidate list, only when all the candidate motion vectors for the CPs of the constructed affine mvp candidate are available, the constructed affine mvp candidate may be added, through which it is possible to reduce the complexity of the process of deriving the constructed affine mvp candidate and the process of constructing the affine mvp candidate list, and to improve the coding efficiency.

In the above-described example, the methods are explained on the basis of a flowchart by means of a series of steps or blocks, but the present disclosure is not limited to the order of steps, and a certain step may occur in a different order or concurrently with other steps than those described above. Further, it may be understood by a person having ordinary skill in the art that the steps shown in a flowchart is not exclusive, and that another step may be incorporated or one or more steps of the flowchart may be removed without affecting the scope of the present disclosure.

Embodiments described in the present document may be embodied and performed on a processor, a microprocessor, a controller or a chip. For example, function units shown in each drawing may be embodied and performed on a processor, a microprocessor, a controller or a chip. In this case, information or algorithm for embodying (e.g., information on instruction) may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a video telephony video device, a transportation means terminal (e.g., a vehicle terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may be also stored in a computer-readable recording medium. The computer-readable recording medium includes all kinds of storage devices and distribution storage devices in which computer-readable data are stored. The computer-readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk and an optical data storage device. Further, the computer-readable recording medium also includes media embodied in the form of a carrier wave (for example, transmission over the Internet). In addition, a bitstream generated by the encoding method may be stored in a computer-readable recording medium or transmitted through a wired or wireless communication network.

Additionally, the examples of the present disclosure may be embodied as a computer program product by program codes, and the program codes may be performed in a computer by the examples of the present disclosure. The program codes may be stored on a computer-readable carrier.

Figure 24:
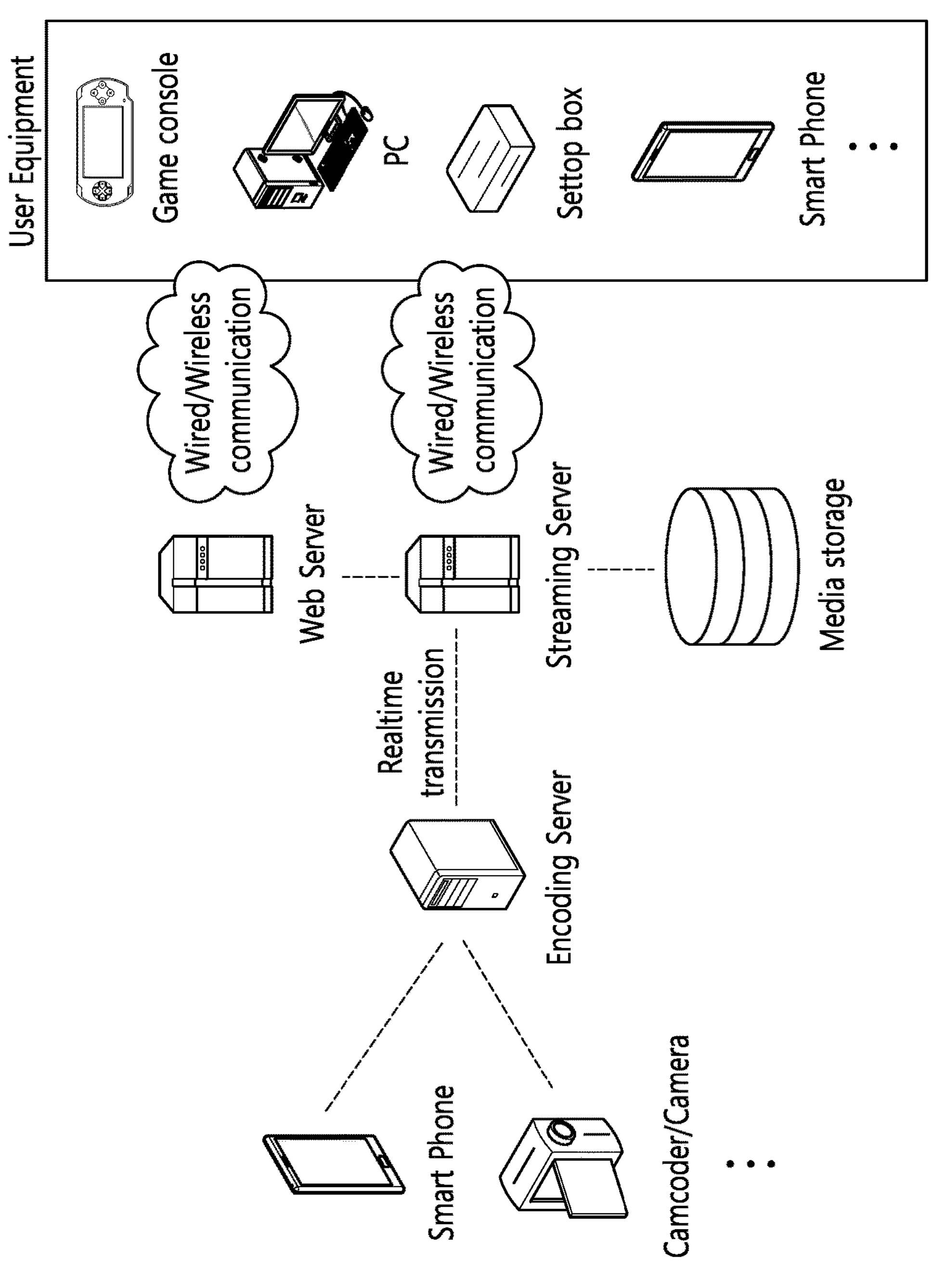
FIG. 24 illustratively represents a contents streaming system structure diagram to which the present disclosure is applied.

FIG. 24 illustratively represents a contents streaming system structure diagram to which the present disclosure is applied.

The contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the smart phone, the camera, the camcoder or the like generates a bitstream by itself, the encoding server may be omitted.

The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of which services there are. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the contents streaming system.

The streaming server may receive contents from the media storage and/or the encoding server. For example, in a case the contents are received from the encoding server, the contents may be received in a real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal), a glass-type terminal (smart glass), a head mounted display (HMD), a digital TV, a desktop computer, a digital signage or the like. Each of servers in the contents streaming system may be operated as a distributed server, and in this case, data received by each server may be distributedly processed.

What is claimed is:

1. An image decoding method performed by a decoding apparatus, the method comprising:

obtaining prediction related information for a current block from a bitstream;

constructing an affine motion vector predictor (mvp) candidate list for the current block;

deriving control point motion vectors (CPMVs) for control points (CPs) of the current block based on the prediction related information and the affine mvp candidate list;

deriving prediction samples for the current block based on the CPMVs; and generating a reconstructed picture for the current block based on the derived prediction samples, wherein based on a constructed affine mvp candidate being available, the affine mvp candidate list includes the constructed affine mvp candidate, wherein the constructed affine mvp candidate includes candidate motion vectors for a first CP, a second CP and a third CP of the current block, wherein an available candidate motion vector for the first CP is derived based on a reference picture of a first block in a first neighboring block group for the first CP being equal to a reference picture of the current block, wherein an available candidate motion vector for the second CP is derived based on a reference picture of a second block in a second neighboring block group for the second CP being equal to the reference picture of the current block, the second neighboring block group for the second CP is different from the first neighboring block group for the first CP, wherein an available candidate motion vector for the third CP is derived based on a reference picture of a third block in a third neighboring block group for the third CP being equal to the reference picture of the current block, the third neighboring block group for the third CP is different from the first neighboring block group for the first CP and the second neighboring block group for the second CP, wherein based on the candidate motion vectors for the first CP, the second CP and the third CP being available, the constructed affine mvp candidate is available, and wherein based on at least one of the candidate motion vector for the first CP, the candidate motion vector for the second CP or the candidate motion vector for the third CP being not available, the constructed affine mvp candidate is not available and the constructed affine mvp candidate is not included in the affine mvp candidate list.

2. An image encoding method performed by an encoding apparatus, the method comprising:

constructing an affine motion vector predictor (mvp) candidate list for a current block;

deriving control point motion vectors (CPMVs) for control points (CPS) of the current block based on the affine mvp candidate list;

deriving prediction samples for the current block based on the CPMVs; and encoding prediction related information for the current block, wherein based on a constructed affine mvp candidate being available, the affine mvp candidate list includes the constructed affine mvp candidate, wherein the constructed affine mvp candidate includes candidate motion vectors for a first CP, a second CP and a third CP of the current block, wherein an available candidate motion vector for the first CP is derived based on a reference picture of a first block in a first neighboring block group for the first CP being equal to a reference picture of the current block, wherein an available candidate motion vector for the second CP is derived based on a reference picture of a second block in a second neighboring block group for the second CP being equal to the reference picture of the current block, the second neighboring block group for the second CP is different from the first neighboring block group for the first CP, wherein an available candidate motion vector for the third CP is derived based on a reference picture of a third block in a third neighboring block group for the third CP being equal to the reference picture of the current block, the third neighboring block group for the third CP is different from the first neighboring block group for the first CP and the second neighboring block group for the second CP, wherein based on the candidate motion vectors for the first CP, the second CP and the third CP being available, the constructed affine mvp candidate is available, and wherein based on at least one of the candidate motion vector for the first CP, the candidate motion vector for the second CP or the candidate motion vector for the third CP being not available, the constructed affine mvp candidate is not available and the constructed affine mvp candidate is not included in the affine mvp candidate list.

3. A transmitting method of data for an image, the method comprising:

obtaining a bitstream of image information including prediction related information for a current block; and transmitting the data comprising the bitstream of the image information including the prediction related information, wherein the prediction related information is information on prediction samples for the current block, wherein the prediction samples are derived based on control point motion vectors (CPMVs) for control points (CPs) of the current block, wherein the CPMVs are derived based on an affine motion vector predictor (mvp) candidate list for the current block, wherein based on a constructed affine mvp candidate being available, the affine mvp candidate list includes the constructed affine mvp candidate, wherein the constructed affine mvp candidate includes candidate motion vectors for a first CP, a second CP and a third CP of the current block, wherein an available candidate motion vector for the first CP is derived based on a reference picture of a first block in a first neighboring block group for the first CP being equal to a reference picture of the current block, wherein an available candidate motion vector for the second CP is derived based on a reference picture of a second block in a second neighboring block group for the second CP being equal to the reference picture of the current block, the second neighboring block group for the second CP is different from the first neighboring block group for the first CP, wherein an available candidate motion vector for the third CP is derived based on a reference picture of a third block in a third neighboring block group for the third CP being equal to the reference picture of the current block, the third neighboring block group for the third CP is different from the first neighboring block group for the first CP and the second neighboring block group for the second CP, wherein based on the candidate motion vectors for the first CP, the second CP and the third CP being available, the constructed affine mvp candidate is available, and wherein based on at least one of the candidate motion vector for the first CP, the candidate motion vector for the second CP or the candidate motion vector for the third CP being not available, the constructed affine mvp candidate is not available and the constructed affine mvp candidate is not included in the affine mvp candidate list.

* * * * *